(12) United States Patent
Kan

(10) Patent No.: US 12,549,280 B2
(45) Date of Patent: Feb. 10, 2026

(54) ELECTRONIC DEVICE AND OPERATION METHOD THEREFOR

(71) Applicant: SK hynix Inc., Icheon-si (KR)

(72) Inventor: Shao Chun Kan, Zhubei (TW)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/631,286

(22) Filed: Apr. 10, 2024

(65) Prior Publication Data

US 2025/0293799 A1    Sep. 18, 2025

(30) Foreign Application Priority Data

Mar. 14, 2024  (TW) ................................ 113109479

(51) Int. Cl.
*H04L 1/00* (2006.01)

(52) U.S. Cl.
CPC .......... *H04L 1/0041* (2013.01); *H04L 1/0057* (2013.01); *H04L 1/0071* (2013.01)

(58) Field of Classification Search
CPC .... H04L 1/0041; H04L 1/0057; H04L 1/0071
See application file for complete search history.

(56) References Cited

U.S. PATENT DOCUMENTS

| | | | |
|---|---|---|---|
| 10,200,116 B2 | 2/2019 | Kitamura et al. | |
| 11,165,556 B2 | 11/2021 | Yang et al. | |
| 2010/0329112 A1* | 12/2010 | Ahn | H04L 25/14 |
| | | | 370/242 |
| 2012/0066531 A1* | 3/2012 | Shafai | H04W 52/0206 |
| | | | 713/323 |
| 2012/0155486 A1* | 6/2012 | Ahn | H04L 5/1423 |
| | | | 370/433 |
| 2021/0105180 A1* | 4/2021 | Ferrer Florit | H04L 69/14 |
| 2022/0094591 A1* | 3/2022 | Sun | H04L 1/0061 |
| 2022/0147254 A1* | 5/2022 | Kang | G06F 3/0635 |

FOREIGN PATENT DOCUMENTS

WO    2022078426 A1    4/2022

* cited by examiner

*Primary Examiner* — Thien Nguyen
(74) *Attorney, Agent, or Firm* — WILLIAM PARK AND ASSOCIATES LTD.

(57) ABSTRACT

Electronic device and operation method therefor are provided. The electronic device is operable to communicate with another electronic device. The operation method comprises the following operations. A forward error correction (FEC) frame to be transmitted via a plurality of active lanes of a link is obtained, wherein the FEC frame includes a data block, an error detection block associated with the data block, and an error correction block associated with the data block and the error detection block. The FEC frame is distributed over the lanes of the link in one of a plurality of different lane distribution orders selectively based on number of active lanes included in the plurality of active lanes. The FEC frame is transmitted over the plurality of lanes of the link to another electronic device.

16 Claims, 22 Drawing Sheets

| Lane 0 | Lane 1 |
|---|---|
| Data 0 | Data 1 |
| Data 2 | Data 3 |
| Data 4 | Data 5 |
| Data 6 | Data 7 |
| ... | ... |
| ECC0[0] | ECC1[1] |
| ECC2[1] | ECC0[1] |

FIG. 4

| Lane 0 | Lane 1 | Lane 2 | Lane 3 |
|---|---|---|---|
| Data 0 | Data 1 | Data 2 | Data 3 |
| Data 4 | Data 5 | Data 6 | Data 7 |
| Data 8 | Data 9 | Data 10 | Data 11 |
| ... | ... | ... | ... |
| ECC0[0] | ECC1[1] | ECC2[1] | ECC0[1] |

FIG. 5

| Lane 0 | Lane 1 | Lane 2 |
|---|---|---|
| Data 0 | Data 1 | Data 2 |
| Data 3 | Data 4 | Data 5 |
| Data 6 | Data 7 | Data 8 |
| Data 9 | Data 10 | Data 11 |
| ... | ... | ... |
|  |  |  |
| ECC0[0] | ECC1[1] | ECC2[1] |

FIG. 6

| Time | Lane 0 | Lane 1 | Lane 2 |
|---|---|---|---|
| T0 | Sync | Sync | Sync |
| T1 | Data 0 | Data 1 | Data 2 |
| T2 | Data 5 | Data 4 | Data 3 |
| T3 | Data 6 | Data 7 | Data 8 |
|  | ... | ... | ... |
| TN | ECC0[0] | ECC1[1] | ECC2[1] |
| TN+1 | Sync | Sync | Sync |
| TN+2 | Data N | Data N+1 | Data N+2 |
| TN+3 | Data N+5 | Data N+4 | Data N+3 |
|  | ... | ... | ... |

FIG. 7

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_PA | | | | | | | | EscParam_PA = PACP_BEGIN | | | | | | | |
| 0 | PACP_FunctionID = PACP_PWR_req | | | | | | | | | | | | | | | |
| 0 | DevID | | | | | | | | Adapt | Flags | | | | | | |
| 0 | TxMode | | TxLane | | TxGear | | | | RxMode | | RxLane | | RxGear | | | |
| 0 | PAPowerModeUserData[0] | | | | | | | | | | | | | | | |
| 0 | PAPowerModeUserData[1] | | | | | | | | | | | | | | | |
| 0 | PAPowerModeUserData[2] | | | | | | | | | | | | | | | |
| 0 | PAPowerModeUserData[3] | | | | | | | | | | | | | | | |
| 0 | PAPowerModeUserData[4] | | | | | | | | | | | | | | | |
| 0 | PAPowerModeUserData[5] | | | | | | | | | | | | | | | |
| 0 | PAPowerModeUserData[6] | | | | | | | | | | | | | | | |
| 0 | PAPowerModeUserData[7] | | | | | | | | | | | | | | | |
| 0 | PAPowerModeUserData[8] | | | | | | | | | | | | | | | |
| 0 | PAPowerModeUserData[9] | | | | | | | | | | | | | | | |
| 0 | PAPowerModeUserData[10] | | | | | | | | | | | | | | | |
| 0 | PAPowerModeUserData[11] | | | | | | | | | | | | | | | |
| 0 | CCITT CRC-16 | | | | | | | | | | | | | | | |

FIG. 10

| Time | Lane 0 | Lane 1 | Lane 2 |
|------|--------|--------|--------|
| T0   | Data 0 | Data 1 | Data 2 |
| T1   | Data 4 | Data 5 | Data 3 |
| T2   | Data 6 | Data 7 | Data 8 |

FIG. 14A

| Time | Lane 0 | Lane 1 | Lane 2 |
|------|--------|--------|--------|
| T0   | Data 1 | Data 0 | Data 2 |
| T1   | Data 5 | Data 4 | Data 3 |
| T2   | Data 6 | Data 8 | Data 7 |

FIG. 14B

| Time | Lane 0 | Lane 1 | Lane 2 |
|------|--------|--------|--------|
| T0   | Data 0 | Data 1 | Data 2 |
| T1   | Data 5 | Data 3 | Data 4 |
| T2   | Data 6 | Data 7 | Data 8 |

FIG. 14C

| Time | Lane 0 | Lane 1 | Lane 2 |
|------|--------|--------|--------|
| T0   | Data 1 | Data 0 | Data 2 |
| T1   | Data 3 | Data 5 | Data 4 |
| T2   | Data 8 | Data 7 | Data 6 |

FIG. 14D

ELECTRONIC DEVICE AND OPERATION METHOD THEREFOR

CROSS-REFERENCE TO RELATED APPLICATION

This non-provisional application claims priority under 35 U.S.C. § 119(a) to Taiwanese Patent Application No. 113109479 filed on Mar. 14, 2024, in the Taiwan Intellectual Property Office, the entire contents of which application is incorporated herein by reference.

1. FIELD OF THE INVENTION

The present disclosure relates to an electronic device and a method therefor, and in particular to methods for an interconnection protocol, a controller therefor, and an electronic device such as a host device and a storage device thereof.

2. DESCRIPTION OF THE RELATED ART

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard or UniPro specification includes a local host and a remote device, wherein the local host may be a computing device or a chip and the remote device may be a storage device implemented by a non-volatile memory or another chip, for example. A bidirectional link is established between the host and the device, and this link in between can be configured with multiple lanes in either of the transmission directions. Each of the host and the device can be implemented with a physical interface according to the M-PHY specification and a link controller according to the UniPro specification.

For all M-PHY symbols transmitted over the link, the physical interface is required to apply a specified line coding (or symbol coding) technique referred to as "8b10b" or "8b/10b" coding defined in the M-PHY specification for DC balance. The link controller also utilizes the symbol encoding technique that UniPro requires for M-PHY correspondingly. In this well-known 8b10b coding scheme, every byte is converted to ten bits and the 8b10b coding has 20% overhead accordingly.

BRIEF SUMMARY OF THE INVENTION

In the present disclosure, technologies for facilitating an interconnection protocol capable of performing a line encoding scheme to improve an effective data rate are provided, and are suitable for an electronic device capable of linking to another electronic device based on the interconnection protocol.

Embodiments of an operation method for an electronic device are provided. The electronic device is operable to communicate with another electronic device. The operation method comprises the following operations. A forward error correction (FEC) frame to be transmitted via a plurality of active lanes of a link is obtained, wherein the FEC frame includes a data block, an error detection block associated with the data block, and an error correction block associated with the data block and the error detection block. The FEC frame is distributed over the plurality of lanes of the link in one of a plurality of different lane distribution orders selectively based on number of active lanes included in the plurality of active lanes. The FEC frame is transmitted over the plurality of lanes of the link to another electronic device.

Embodiments of an electronic device configured to communicate with another electronic device are provided. The electronic device comprises an interconnection controller including a physical layer circuit for signal transmission and a link controller for data transmission, coupled to the physical layer circuit. The interconnection controller is capable of performing a plurality of operations including: generating a forward error correction (FEC) to be transmitted via a plurality of active lanes of a link, the FEC frame including a data block, an error detection block associated with the data block, and an error correction block associated with the data block and the error detection block; distributing the FEC frame over the plurality of lanes of the link in one of a plurality of different lane distribution orders selectively based on number of active lanes included in the plurality of active lanes; and transmitting the FEC frame over the plurality of lanes of the link to another electronic device.

In some embodiments of the operation method or the electronic device, the error correction block is obtained based on an N-way interleaved forward error correction (FEC) scheme, wherein N is greater than or equal to three.

In some embodiments of the operation method or the electronic device, data symbols of the FEC frame are divided into N forward error correction (FEC) groups for the N-way interleaved FEC scheme, wherein for at least two of the plurality of lanes, every two adjacent data symbols distributed on the same lane and taken from the FEC frame are associated with two of the N FEC groups.

In some embodiments of the operation method or the electronic device, data symbols of the FEC frame are divided into N forward error correction (FEC) groups for the N-way interleaved FEC scheme; when the number of active lanes is a positive multiple of N, the data symbols of the FEC frame are distributed over the plurality of lanes of the link in a first lane distribution order selected based on the number of active lanes, wherein in the first lane distribution order, for each of the plurality of lanes, one of the data symbols for one of the N FEC groups on one of the lanes is followed by another one of the data symbols for another one of the N FEC groups on the same lane.

In some embodiments of the operation method or the electronic device, when the number of active lanes is not a positive multiple of N, the data symbols of the FEC frame are distributed over the plurality of lanes of the link in a second lane distribution order selected based on the number of active lanes, wherein in the second lane distribution order, for each of the plurality of lanes, one of the data symbols for one of the N FEC groups on one of the lanes is followed by another one of the data symbols for another one of the N FEC groups on the same lane, wherein the second lane distribution order is different from the first lane distribution order.

In some embodiments of the operation method or the electronic device, the data block includes data symbols from a data link layer or a physical adapter layer of the electronic device.

In some embodiments of the operation method or the electronic device, the data symbols from the data link layer or physical adapter layer of the electronic device are based on a Unified Protocol (UniPro).

BRIEF DESCRIPTION OF THE DRAWINGS

FIG. 4 is a schematic diagram illustrating an example of distributing a forward error correction (FEC) frame over a two-lane link in a lane distribution order.

FIG. 5 is a schematic diagram illustrating an example of distributing a forward error correction (FEC) frame over a four-lane link in the lane distribution order.

FIG. 6 is a schematic diagram illustrating an example of distributing a forward error correction (FEC) frame over a three-lane link in the lane distribution order.

FIG. 7 is a schematic diagram illustrating an example of distributing a forward error correction (FEC) frame over a three-lane link in another lane distribution order.

FIG. 10 is a schematic diagram illustrating an example of a power mode change request frame.

FIG. 14A is a schematic diagram illustrating an example of a lane distribution order.

FIG. 14B is a schematic diagram illustrating an example of a lane distribution order.

FIG. 14C is a schematic diagram illustrating an example of a lane distribution order.

FIG. 14D is a schematic diagram illustrating an example of a lane distribution order.

DETAILED DESCRIPTION OF THE INVENTION

Figure 1:
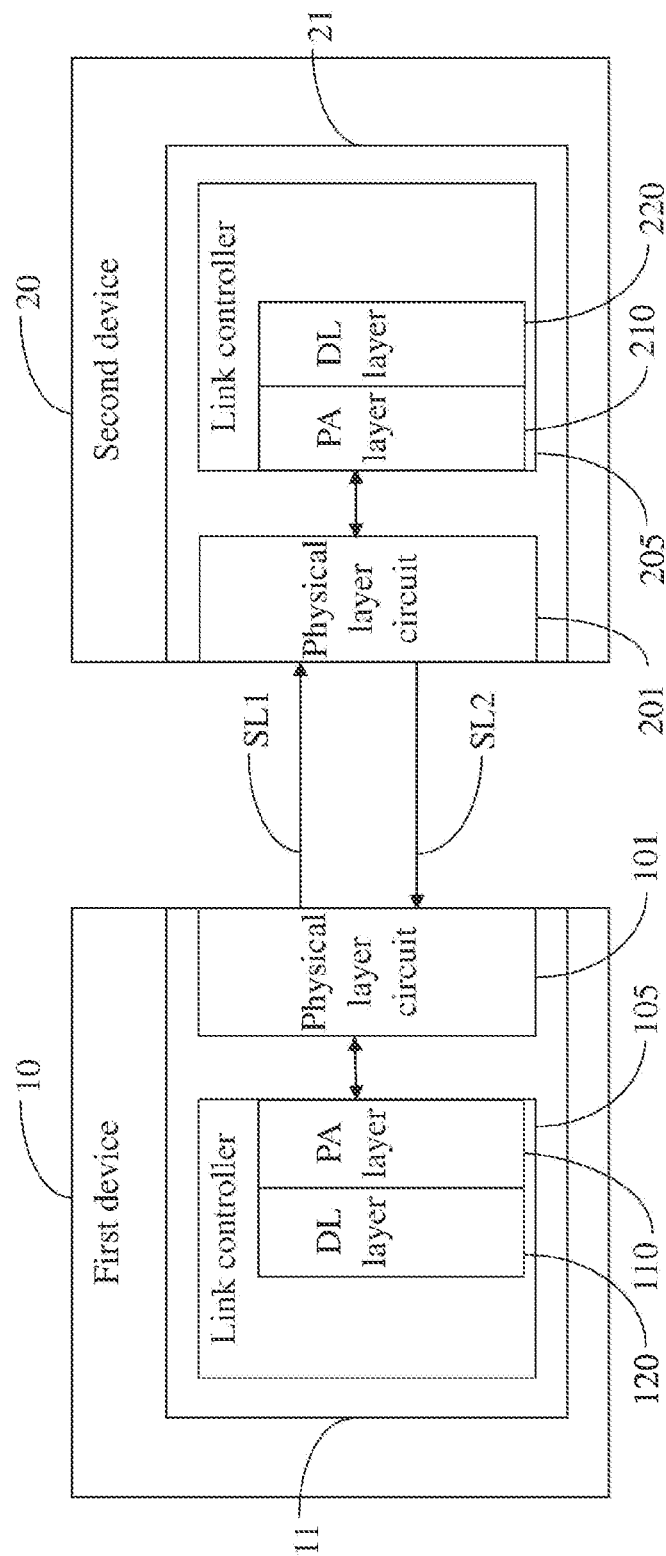
FIG. 1 is a block diagram illustrating an embodiment of a communication system capable of communication according to an interconnection protocol.

To facilitate understanding of the object, characteristics and effects of this present disclosure, embodiments together with the attached drawings for the detailed description of the present disclosure are provided.

In the present disclosure, embodiments of an interconnection protocol with a coding scheme are provided. The coding scheme hereafter indicates a 1b/1b coding scheme having an effective data rate larger than an effective data rate of 8b/10b coding scheme. In addition, embodiments of a data structure for data transmission for the coding scheme, referred to as a forward error correction (FEC) frame, for the interconnection protocol are provided for improved data throughput. In addition, a forward error correction (FEC) scheme can be adopted in conjunction with an advanced signaling scheme such as a pulse amplitude modulation with n levels (PAM-n) signaling (where n>2) to reduce re-transmission rate.

The interconnection protocol can be derived from the UFS standard or UniPro specification. The interconnection protocol can also be regarded as a proposed or enhanced version of the UFS standard or UniPro specification in the future. The FEC scheme can be implemented in the interconnection protocol as an advanced operation mode, or referred to as a high-speed mode, which indicates that an electronic device compliant with the interconnection protocol operating in this mode is capable of data transmission by using an FEC scheme.

In some embodiments, an advanced signaling scheme for bits transmission different from conventional signaling schemes, such as Non-Return-to-Zero (NRZ) or Pulse Width Modulation (PWM), available in the current M-PHY specification, is further adopted in conjunction with the FEC scheme to enhance overall data throughput. For example, signaling schemes for bits transmission such as a pulse amplitude modulation with n level (PAM-n, where n>2) can be adopted together with the FEC scheme, wherein n is an integer such as 3, 4, 5, 6, 8, or 16.

Various embodiments are provided below for facilitating the interconnection protocol, and are suitable for an electronic device capable of communicating with another electronic device according to the interconnection protocol.

As mentioned above, the interconnection protocol can be derived from the UniPro specification or UFS standard. For example, a conventional UFS system includes a UFS host and a UFS device. The UFS host and the UFS device communicate each other through respective UFS Interconnect (UIC) layer including UniPro and M-PHY. Accordingly, the interconnection protocol can be implemented and derived from architecture of the conventional UFS system by using a modified UFS system implementing a modified version of UniPro and a modified version of M-PHY. Further, the interconnection protocol can also be implemented in a communication system including a host and a device each having respective link layer (such as a modified version of UniPro) and respective physical layer (such as a modified version of M-PHY) both compliant.

Further, in the present disclosure, technologies for improving performance of data frame transmission are provided, and are suitable for an electronic device capable of communicating with another electronic device according to the interconnection protocol. Embodiments of a device and a method for facilitating data frame transmission are provided. By using the technologies, data frame transmission can be performed effectively and more efficiently, thereby reducing re-transmission rate and enhancing performance.

FIG. 1 is a block diagram illustrating an embodiment of a communication system capable of communication according to the interconnection protocol. The interconnection protocol, for example, is based on a modified UniPro specification, a modified UFS system, or other related communication protocols or specifications, and so on, whenever appropriate. The communication system, for example, includes a first device 10 and a second device 20, which can be a local host and a remote device respectively, or vice versa. In FIG. 1, the first device 10 includes a link controller 100 and a physical layer circuit 105 for signal transmission, which is implemented as an interconnection controller 11. Likewise, the second device 20 includes a link controller 200 and a physical layer circuit 205 for signal transmission, which is implemented as an interconnection controller 21. The link controller 100 of the first device 10 for example implements a protocol layer of the interconnection protocol (or "link layer," with respect to the physical layer such as M-PHY) such as a modified UniPro layer including such as a physical adapter (PA) layer 110, a data link (DL) layer 120, and so on; and likewise, the link controller 200 of the second device 20 for example also implements the protocol layer (or "link layer") such as a modified UniPro layer including such as a physical adapter (PA) layer 210, a data link (DL) layer 220, and so on. The first device 10 is capable of communicating with the second device 20 through a link including at least one data lane SL1 and at least one data lane SL2, which are bidirectional, according to the interconnect protocol. For example, the interconnection protocol is applicable to a wide range of device types (e.g., for first device or second device) such as application processors, co-processors, modems, storage subsystems including non-volatile memory modules, displays, camera sensors, 3D graphics and multimedia accelerators, chips, and so on. It is also applicable to different types of data traffic such as control messages, bulk data transfer and packetized streaming. Other related MIPI alliance specifications or other related specifications can also be used for implementation of the physical layer or application layer, whenever appropriate.

The physical layer is referred to as a modified physical layer or a modified M-PHY. In some embodiments, the modified physical layer is implemented as an interface circuit to perform bits transmission of the above-mentioned "FEC frame" coming from the modified PA layer in the FEC mode, in which 8b/10b coding is not used or bypassed. In this manner, the modified PA layer can be configured to perform the line encoding scheme to generate FEC frames in the FEC mode. For example, the modified M-PHY is implemented to perform bits transmission in the line encoding scheme in addition to bits transmission for conventional 8b/10b encoding or implemented to be dedicated for the FEC scheme instead of 8b/10b encoding. For example, the modified M-PHY is implemented to perform bits transmission using a specific signaling scheme, such as PAM-n (where n>2, e.g., PAM-4), which can be utilized in the FEC mode. In addition, in an implementation of the modified M-PHY, the interface between the modified PA layer and the modified physical layer can be a signaling interface for an advanced line encoding scheme (e.g., FEC scheme) with a larger bus width, e.g., a bus width of 80 bits, 128 bits, 160 bits or more, for example, based on Reference M-PHY MODULE Interface (RMMI).

Figure 2:
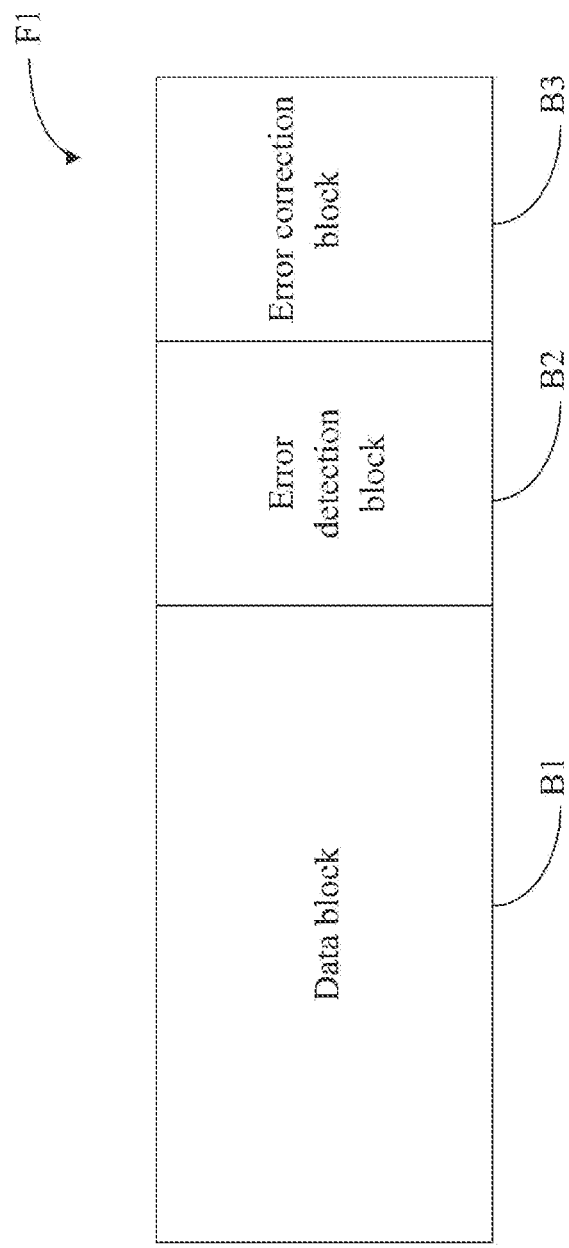
FIG. 2 is a schematic diagram illustrating a forward error correction (FEC) frame according to an embodiment of the present disclosure.

FIG. 2 illustrates a forward error correction (FEC) frame according to an embodiment of the present disclosure. A forward error correction (FEC) frame F1 in FIG. 2 is to be transmitted via a plurality of active lanes of a link. The FEC frame F1 including a data block B1, an error detection block B2 associated with the data block B1, and an error correction block B3 associated with the data block B1 and the error detection block B2. The data block B1 can include one or more data link layer frames or a physical adapter layer frame for the interconnection protocol. The error detection block B2 can be error detection codes such as cyclic redundancy check (CRC) codes generated based on CRC calculation such as CRC-16, CRC-32, CRC-64, or so on by using a CRC engine to protect the data block B1. The CRC engine, for example, can be a CRC calculation circuit to perform associated CRC calculation including circuit components such as shift registers and logic gates. In addition, in some embodiments, the error correction block B3 is obtained based on a multi-way (or called N-way) interleaved forward error correction (FEC) scheme, where N is greater than or equal to three. The error correction block B3 can be error correction codes such as forward error correction (FEC) codes generated based on a multi-way interleaved FEC scheme by using multi-way interleaved error correction code (ECC) engines to protect the data block B1 and the error detection block B2.

Figure 3:
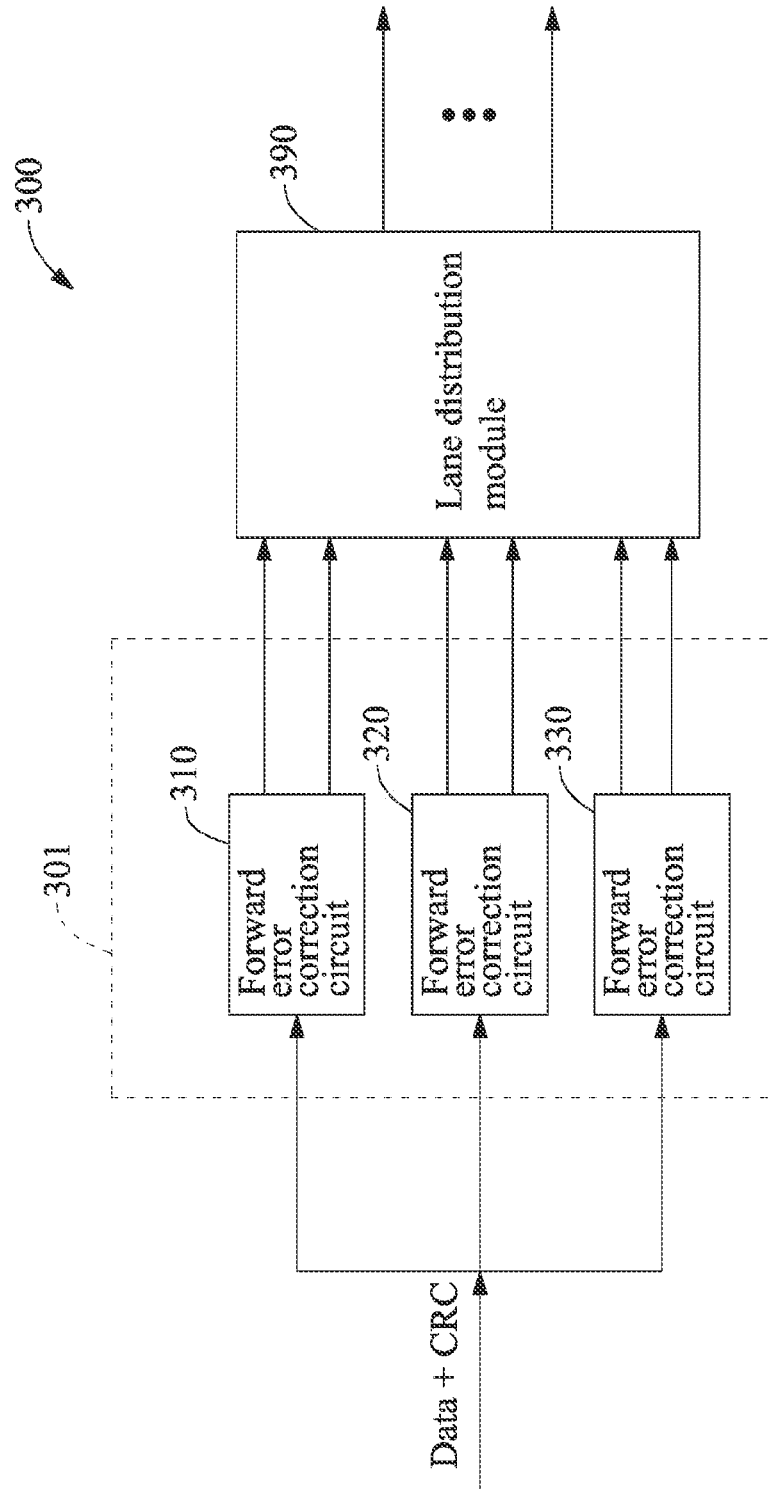
FIG. 3 is a schematic diagram illustrating an embodiment of circuit architecture based on a three-way interleaved forward error correction (FEC) scheme.

Referring to FIGS. 2-3, an embodiment of generating an FEC frame is illustrated based on a three-way interleaved forward error correction (FEC) scheme. In this embodiment, each FEC frame has a fixed size of 272 bytes and the FEC frame, based on FIG. 2, includes a data block (B1) with 258 bytes of data, an error detection block (B2) with 8 bytes of error detection codes (e.g., CRC), and an error correction block (B3) with 6 bytes of error correction codes (ECC). An FEC frame of 272 bytes can be split into three FEC groups, denoted by FEC0, FEC1, and FEC2, for example, having 91 bytes wide, 91 bytes wide, and 90 bytes wide, respectively. In this embodiment, each of these three FEC groups is protected by a dedicated set of two ECC bytes present within the FEC group. For example, Reed-Solomon codes are used as ECC codes and each symbol is an 8-bit data symbol. Each of the three FEC groups has the recovery capability of a single byte. In other words, errors occur in a data symbol of an FEC group can be corrected by the two ECC bytes for the FEC group if the other data symbols of the FEC groups are correct. If errors occur across two data symbols in an FEC group, the errors cannot be corrected by the two ECC bytes for the FEC group. In addition, the CRC codes of the FEC frame are used to only detect errors, if any, in the data block but cannot correct the errors.

As shown in FIG. 3, circuit architecture 300 based on a three-way interleaved forward error correction (FEC) scheme comprises a three-way interleaved FEC circuit 301 including three forward error correction (FEC) circuits 310, 320, and 330. The three-way interleaved FEC scheme can be performed by applying data of a data block (e.g., 258 bytes) with its associated error detection block (e.g., 8 bytes), as indicated by "Data+CRC" in FIG. 3, to the FEC circuits 310-330 sequentially. Each of the FEC circuits 310-330, for example, can be a corresponding ECC encoder having a calculation circuit to generate two ECC bytes with respect to an associated portion of data of an FEC group, based on associated ECC calculation. Referring to FIG. 3, a first group of data and its CRC codes (e.g., total 89 bytes) is applied to the FEC circuit 310 to generate two bytes of ECC bytes (e.g., denoted by ECC0[0] and ECC0[1]). A second group of data and its CRC codes (e.g., total 89 bytes) is applied to the FEC circuit 320 to generate two bytes of ECC bytes (e.g., denoted by ECC1[0] and ECC1[1]), and a third group of data and its CRC codes (e.g., total 88 bytes) is applied to the FEC circuit 330 to generate two bytes of ECC bytes (e.g., denoted by ECC2[0] and ECC2[1]).

As illustrated in FIG. 3, the data block, CRC codes, and ECC codes of the three FEC groups of the FEC frame (e.g., 272 bytes) are output to a lane distribution module 390. The lane distribution module 390 distributes data symbols of the three FEC groups (i.e., the FEC frame) over one or more active lanes in an order, which is referred to as a lane distribution order (or sequence). For example, in a first lane distribution order, data symbols of the FEC groups FEC0, FEC1, and FEC2 of the FEC frame are distributed over a plurality of active lanes byte-by-byte according to the FEC groups alternately, such as FEC0, FEC1, FEC2, FEC0, FEC1, FEC2, and so on. Accordingly, a receiving side can perform forward error correction on the received FEC frame using the ECC bytes.

Depending on the number of active lanes and a specific lane distribution order, the lane distribution module 390 may result in different situations of lane distribution as illustrated in FIGS. 4-7 and related Figures. In FIGS. 4-7 and so on, a column (such as one labeled "Lane 0") is associated with a specific lane (e.g., Lane 0) and represents the data symbols that the lane distribution module 390 distributes on the lane along with time. In addition, each data symbol of the FEC frame is illustrated as a rectangle with a legend (such as "Data 0", "Data 1", and so on) and in a background style which indicates the associated FEC group that the data symbol belongs to, based on the 3-way interleaved FEC scheme as mentioned above. For example, the rectangles in the background style of being filled with backslash, blank, or being filled with dots represent FEC groups FEC0, FEC1, and FEC2 of the FEC frame, respectively.

FIG. 4 illustrates an example of distributing an FEC frame over a two-lane link (or two active lane of a link) in the first lane distribution order such as FEC0, FEC1, FEC2, FEC0, FEC1, FEC2, and so on. As shown in FIG. 4, two lanes, denoted by lane 0 and lane 1, are active, and on lane 0 or lane 1, every two adjacent data symbols are associated with two different FEC groups. In this manner, when the FEC frame are transmitted from an electronic device to another electronic device and errors occur across two data symbols of the FEC frame on lane 0 (or lane 1), the other electronic device can recover the erroneous data by two set of ECC codes of the associated FEC groups.

FIG. 5 illustrates an example of distributing an FEC frame over a four-lane link in the first lane distribution order. As shown in FIG. 5, four lanes, denoted by lane 0, lane 1, lane 2, and lane 3, are active, and every two adjacent data symbols on a same lane are associated with two different FEC groups. In this manner, when the FEC frame are transmitted from an electronic device to another electronic device and errors occur across two data symbols of the FEC frame on one of the lane 0-3, the other electronic device can recover the erroneous data by two set of ECC codes of the associated FEC groups.

FIG. 6 illustrates an example of distributing a forward error correction (FEC) frame over a three-lane link in the first lane distribution order. As shown in FIG. 6, three lanes, denoted by lane 0, lane 1, and lane 2, are active, and every two adjacent data symbols on a same lane are associated with the same FEC group. In this case, when the FEC frame are transmitted from an electronic device to another electronic device and errors occur across two data symbols of the FEC frame on a same lane (e.g., lane 0), the other electronic device cannot recover the erroneous data by two set of ECC codes of the associated FEC groups.

As can be observed from FIG. 4 and FIG. 5, for a three-way interleaved FEC scheme, when the number of active lanes is not a multiple of three (e.g., two, four or so on), every two adjacent data symbols distributed on the same lane and taken from the FEC frame are associated with two different FEC groups of the three FEC groups. However, when the number of active lanes is a multiple of three, every two adjacent data symbols distributed on a same lane and taken from the FEC frame are associated with the same FEC groups.

In order to resolve this problem, the lane distribution module 300 can be configured to select one of a plurality of lane distribution orders selectively based on number of active lanes according to an embodiment. FIG. 7 illustrates an embodiment of distributing a forward error correction (FEC) frame over a three-lane link in a second lane distribution order. In the second lane distribution order, data symbols of the FEC groups FEC0, FEC1, and FEC2 of the FEC frame are distributed over a plurality of active lanes byte-by-byte according to the FEC groups in "cross" order, such as FEC0, FEC1, FEC2, FEC2, FEC1, FEC0, FEC0, FEC1, FEC2, FEC2, FEC1, FEC0, and so on. In FIG. 7, in a clock cycle T0, a synchronization pattern is transmitted from the transmitting side to inform the receiver of the receiving side that the new lane distribution order will start from here. The purpose of transmitting the synchronization pattern is that the receiver can synchronize again for some error recovery conditions. In a clock cycle T1, "Data 0", "Data 1", "Data 2" are distributed on lane 0, lane 1, lane 2, respectively. In a clock cycle T2, "Data 5", "Data 4", "Data 3" are distributed on lane 0, lane 1, lane 2, respectively. In a clock cycle T3, "Data 6", "Data 7", "Data 8" are distributed on lane 0, lane 1, lane 2, respectively. In this manner, the sequence as illustrated for the clock cycle T1 and T2, can be repeated consecutively. On at least two of the active lanes, any two adjacent data symbols along with time (such as "Data 0" and "Data 5") belong to different FEC groups. Thus, using the second lane distribution order can avoid that any two adjacent data symbols in the same lane (e.g., lane 0 and lane 2, at least) are in the same FEC, such as the situation shown in FIG. 7. The second lane distribution order can also protect the error in the different lanes in the same time. For example, in the clock cycle T1, if errors occur in "Data 1" on lane 1 and "Data 0" on lane 0, the errors can be corrected. In another embodiment based on FIG. 7, in a clock cycle T2, "Data 4", "Data 5", "Data 3" or "Data 4", "Data 3", "Data 5" can be distributed on lane 0, lane 1, lane 2, respectively.

Figure 8:
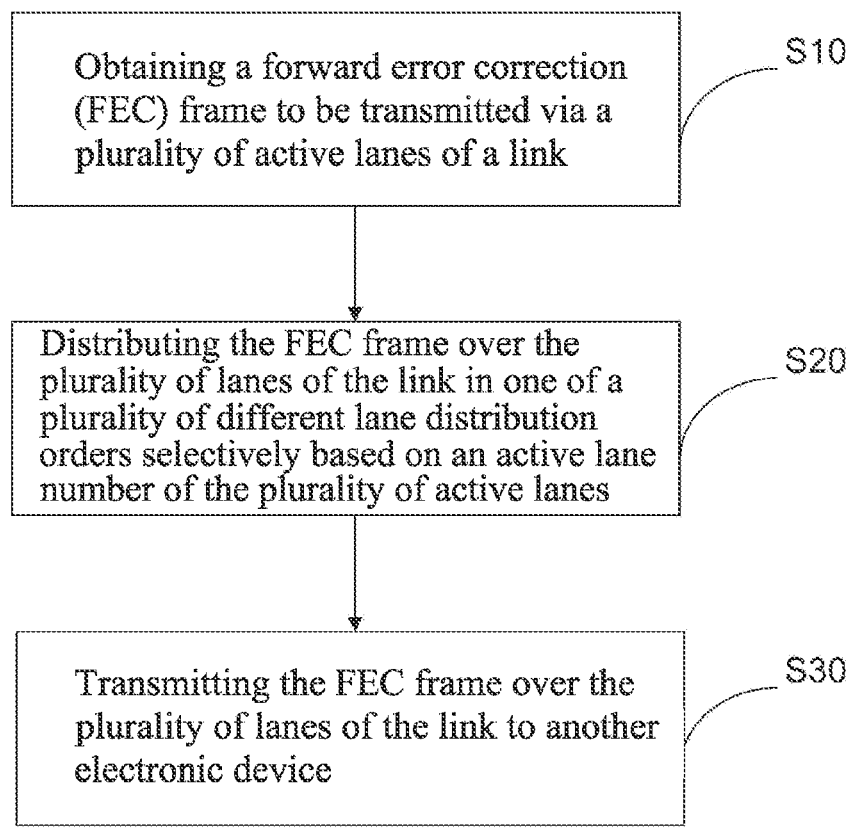
FIG. 8 is a flowchart illustrating an embodiment of an operation method for an electronic device.

FIG. 8 illustrates an embodiment of an operation method for an electronic device. The electronic device is operable to communicate with another electronic device according to the interconnection protocol. The operation method includes steps S10-S30 as follows.

In step S10, a forward error correction (FEC) frame to be transmitted via a plurality of active lanes of a link is obtained. For example, the FEC frame, based on FIG. 2 and FIG. 3, includes a data block B1, an error detection block B2 associated with the data block B1, and an error correction block B3 associated with the data block B1 and the error detection block B2. In some embodiments, the error correction block B3 is obtained based on an N-way interleaved forward error correction (FEC) scheme, where N is greater than or equal to three.

In step S20, the FEC frame is distributed over the plurality of lanes of the link in one of a plurality of different lane distribution orders selectively based on number of active lanes included in the plurality of active lanes.

In step S30, the FEC frame is transmitted over the plurality of lanes of the link to another electronic device.

In some embodiments, data symbols of the FEC frame are divided into N forward error correction (FEC) groups for the N-way interleaved FEC scheme, wherein for at least two or every one of the plurality of lanes, every two adjacent data symbols distributed on the same lane and taken from the FEC frame are associated with two of the N FEC groups.

Figure 9:
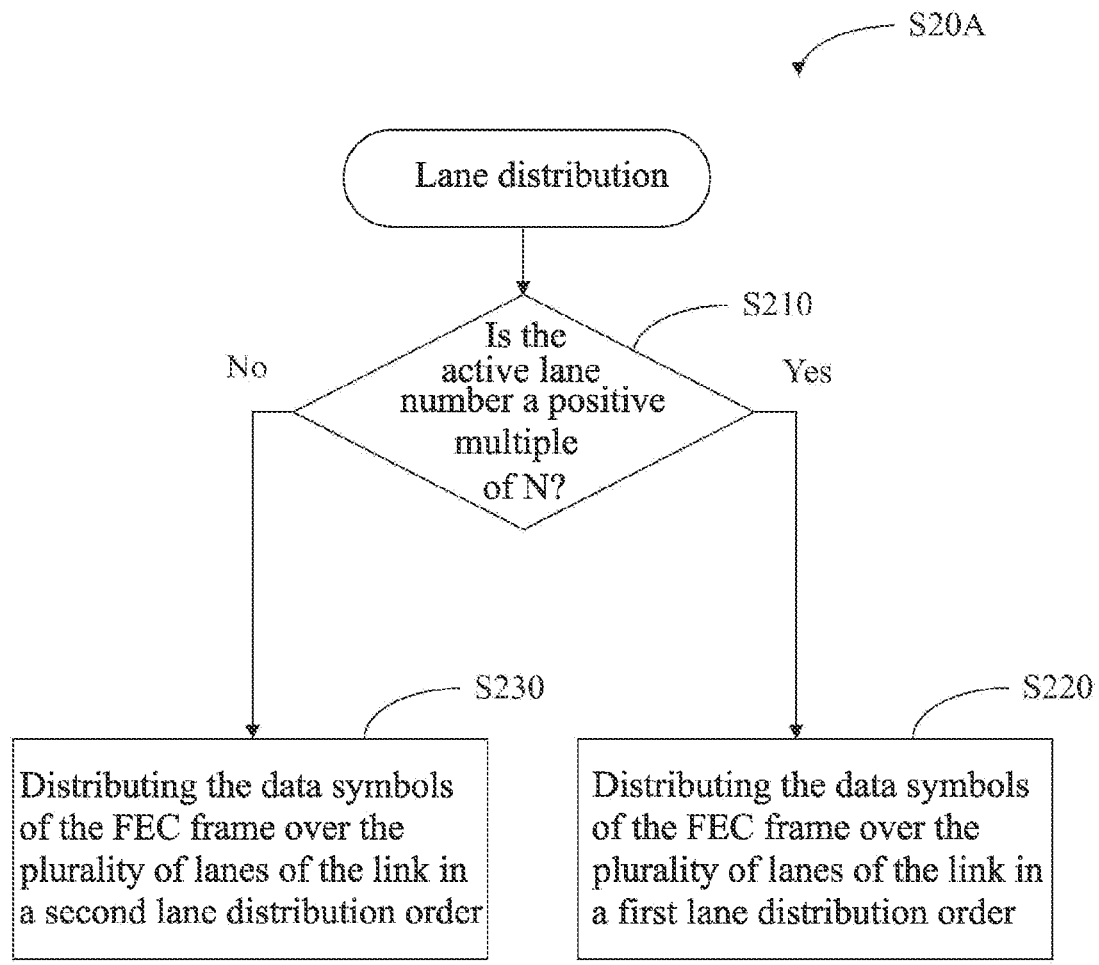
FIG. 9 is a flowchart illustrating an embodiment of step S20.

FIG. 9 illustrating an embodiment of step S20. In FIG. 9, step S20A is an embodiment of step S20 of FIG. 8. Step S20A includes steps S210-S230 as follows.

In step S210, it is determined whether the number of active lanes is a positive multiple of N. If the number of active lanes is a positive multiple of N, step S220 is performed. If the number of active lanes is not a positive multiple of N, step S230 is performed.

In step S220, the number of active lanes is a positive multiple of N, and the data symbols of the FEC frame are distributed over the plurality of lanes of the link in a first lane distribution order selected based on the number of active lanes. In the first lane distribution order, for each of the plurality of lanes, one of the data symbols for one of the N FEC groups on one of the lanes is followed by another one of the data symbols for another one of the N FEC groups on the same lane. For example, if N=3 and the number of active lanes is 3, a lane distribution order shown in FIG. 7 is selected accordingly.

In step S230, the number of active lanes is not a positive multiple of N, and the data symbols of the FEC frame are distributed over the plurality of lanes of the link in a second lane distribution order selected based on the number of active lanes. In the second lane distribution order, for each of the plurality of lanes, one of the data symbols for one of the N FEC groups on one of the lanes is followed by another one of the data symbols for another one of the N FEC groups on the same lane, wherein the second lane distribution order is different from the first lane distribution order. For example, if N=3 and the number of active lanes is 2 or 4, another lane distribution order shown in FIG. 4 or FIG. 5 is selected.

In some embodiments, the data block includes data symbols from a data link layer or a physical adapter layer of the electronic device.

In some embodiments, the data symbols from the data link layer or physical adapter layer of the electronic device are based on a Unified Protocol (UniPro).

In following, embodiments are provided to demonstrate the implementation of the method of FIG. 8 to apply different lane distribution order in the interconnection protocol.

In order to apply different lane distribution order, it needs to perform power mode change. A power mode change is used when changing a link's power configuration. FIG. 10 illustrates an example of a power mode change request frame (denoted by PACP_PWR_req) according to the UniPro specification (e.g., UniPro version 2.0). In FIG. 10, two of the power configuration parameters related to numbers of active lanes are "TxLane" and "RxLane". "TxLane" stands for Active Lane count for TX-direction (PA_ActiveTxDataLanes) and "RxLane" stands for Active Lane count for RX-direction (PA_ActiveRxDataLanes). When an electronic device according to the interconnection protocol receives the TxLane or RxLane, the power configuration parameters can be used to configure the lane distribution module (e.g., 390) to select a lane distribution order suitable for the power configuration parameters.

In addition, according to the UniPro specification, each of the PACP frames of the PA layer includes a series of encoded 17-bit symbols. As shown in FIG. 10, in the first symbol (which has 17 bits) of the PACP_PWR_req frame, bit 16 in a value 1 indicates that the first symbol is a control symbol; the first symbol includes a value ESC_PA and a parameter EscParam_PA which is set to a value PACP_BEGIN, indicating that the frame is a frame of the PA layer and the first symbol is the start of the PACP frame, respectively. Moreover, as shown in FIG. 10, in the second symbol (which has 17 bits) of the PACP_PWR_req frame, bit 16 in a value 0 indicates that the second symbol is a data symbol; a field PACP_FunctionID in the second symbol which is set to a value PACP_PWR_req (e.g., 0x0306 defined in the UniPro specification) indicates that the frame is a PACP_PWR_req frame associated with power configuration information. Moreover, as shown in FIG. 10, in the third symbol to the last symbol (each of which has 17 bits) of the PACP_PWR_req frame, bit 16 in a value 0 indicates that these symbols are all data symbols. The third symbol to the last symbols include a plurality of fields respectively, for example, fields including DevID, Adapt, Flags, TxMode, TxLane, TxGear, RxMode, RxLane, RxGear, PAPowerModeUserData[0]-PAPowerModeUserData[11]. The last symbol includes a checksum (e.g., a 16-bit CRC code such as CCITT CRC-16), wherein CCITT stands for International Telegraph and Telephone Consultative Committee.

Figure 11:
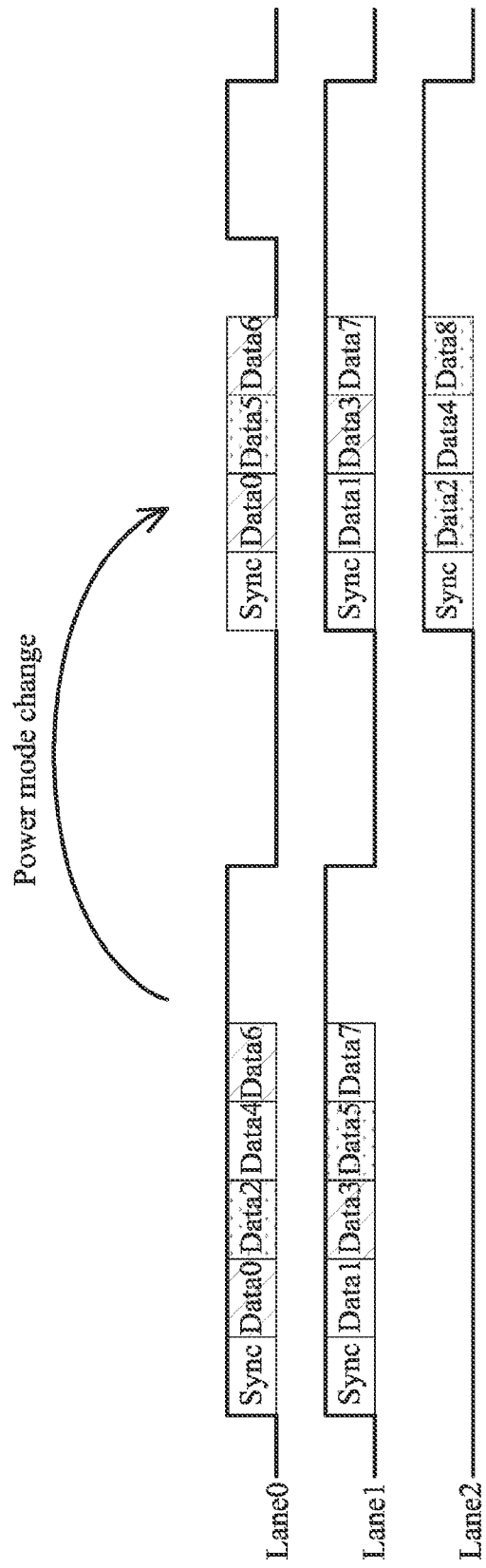
FIG. 11 is a schematic diagram illustrating an example of distributing forward error correction (FEC) frames in different lane distribution orders before and after a power mode change.

FIG. 11 illustrates an example of distributing forward error correction (FEC) frames in different lane distribution orders before and after a power mode change. In FIG. 11, the power mode change happens, changing from two active lanes to three active lanes. The lane number configuration is changed so the lane distribution order is also changed. As shown in FIG. 11, after the power mode change, three lanes, denoted by lane 0, lane 1, and lane 2, are active, and every two adjacent data symbols on a same lane are associated with the different FEC groups. In this case, when the FEC frame are transmitted from an electronic device to another electronic device and errors occur across two data symbols of the FEC frame on a same lane (e.g., lane 0), the other electronic device can recover the erroneous data by two set of ECC codes of the associated FEC groups.

Figure 12:
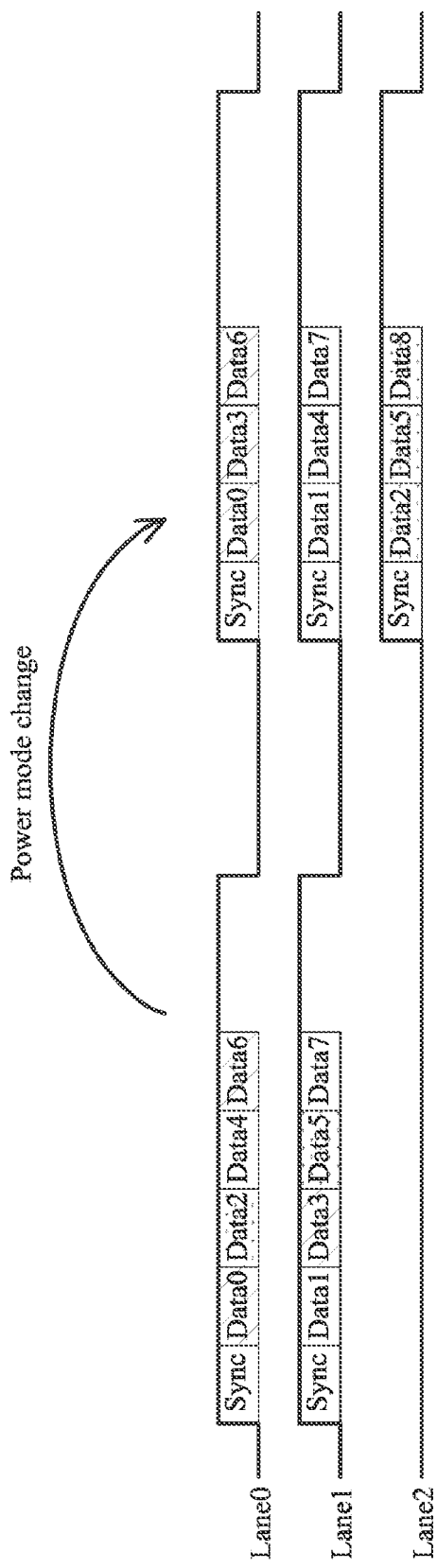
FIG. 12 is a schematic diagram illustrating an example of distributing forward error correction (FEC) frames in a same lane distribution order before and after a power mode change.

FIG. 12 illustrates an example of distributing forward error correction (FEC) frames in a same lane distribution order before and after a power mode change. In FIG. 12, the number of active lanes changes from two to three but the lane distribution order remains unchanged, such as general lane distribution order of FEC0, FEC1, FEC2, FEC0, FEC1, FEC2, and so on. In a case, errors occur across two adjacent data symbols on a lane (e.g., lane 0). The two symbol error is beyond the error correction capability of an FEC frame. In this case, it is required to use a negative acknowledgement control (NAC) frame to request the peer side for re-transmission of the FEC frame. Especially, when the FEC frame is transmitted over the plurality of lanes of the link to another electronic device by using a PAM-4 signaling scheme, which has a higher error bit error rate, a NAC frame is more likely to occur, thus increasing re-transmission rate. This will make the performance degraded a lot. By contrast, the example of distributing forward error correction (FEC) frames in different lane distribution orders as illustrated in FIG. 11 or related examples is capable of reducing the re-transmission rate and enhancing the performance.

Figure 13:
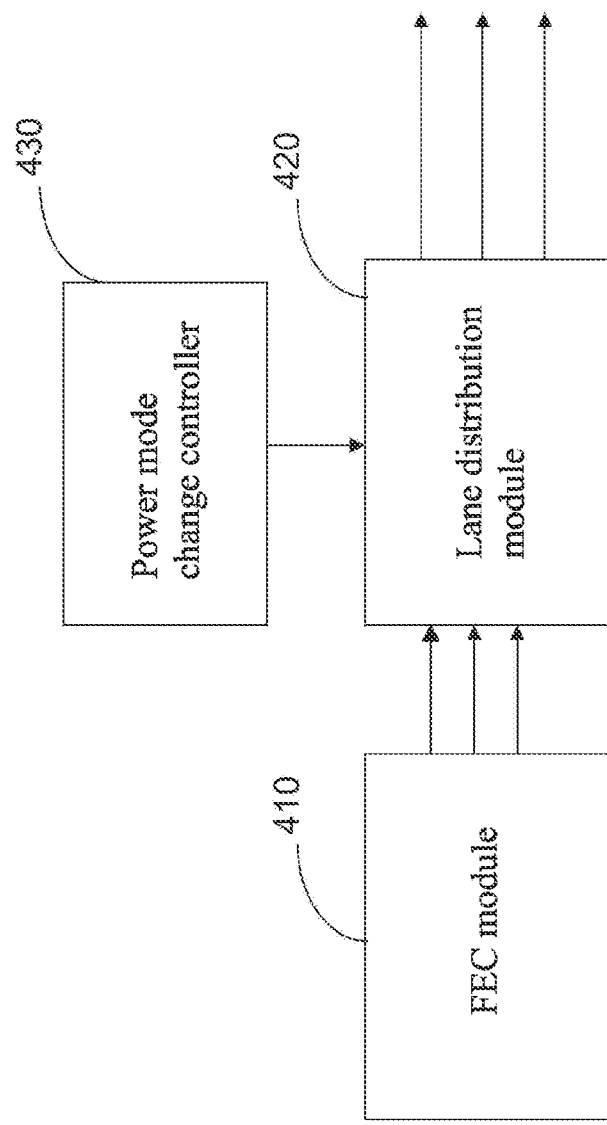
FIG. 13 is a block diagram illustrating circuit architecture for lane distribution.

FIG. 13 is a block diagram illustrating circuit architecture for lane distribution. In FIG. 13, the circuit architecture includes an FEC module 410, a lane distribution module 420, and a power mode change controller 430. The FEC module 410 outputs an FEC frame and the lane distribution module 420 distributes the FEC frame over a plurality of lanes. The power mode change controller 430 is a circuit module for handling a power mode change procedure, for example, derived from a UniPro specification (e.g., UniPro version 2.0 and so on). The power mode change controller 430 can output number of active lanes to a lane distribution module 420. The lane distribution module 420 is configured to perform step S20 of FIG. 8 to distribute the FEC frame over the plurality of lanes of the link in one of a plurality of different lane distribution orders selectively based on number of active lanes (e.g., TxLane or RxLane) received from the power mode change controller 430.

FIGS. 14A-14D illustrate examples of different lane distribution orders. As shown in any of FIG. 14A-14D, three lanes, denoted by lane 0, lane 1, and lane 2, are active, and on lane 0, lane 1, or lane 2, every two adjacent data symbols on a lane are associated with two different FEC groups. In this manner, when the FEC frame are transmitted from an electronic device to another electronic device and errors occur across two data symbols of the FEC frame on lane 0, the other electronic device can recover the erroneous data by two set of ECC codes of the associated FEC groups. In addition, as compared with the situation shown in FIG. 6, using the lane distribution order as shown in any one of FIGS. 14A-14D can make the FEC frame can be corrected when errors occur across two data symbols of a lane.

Figure 15:
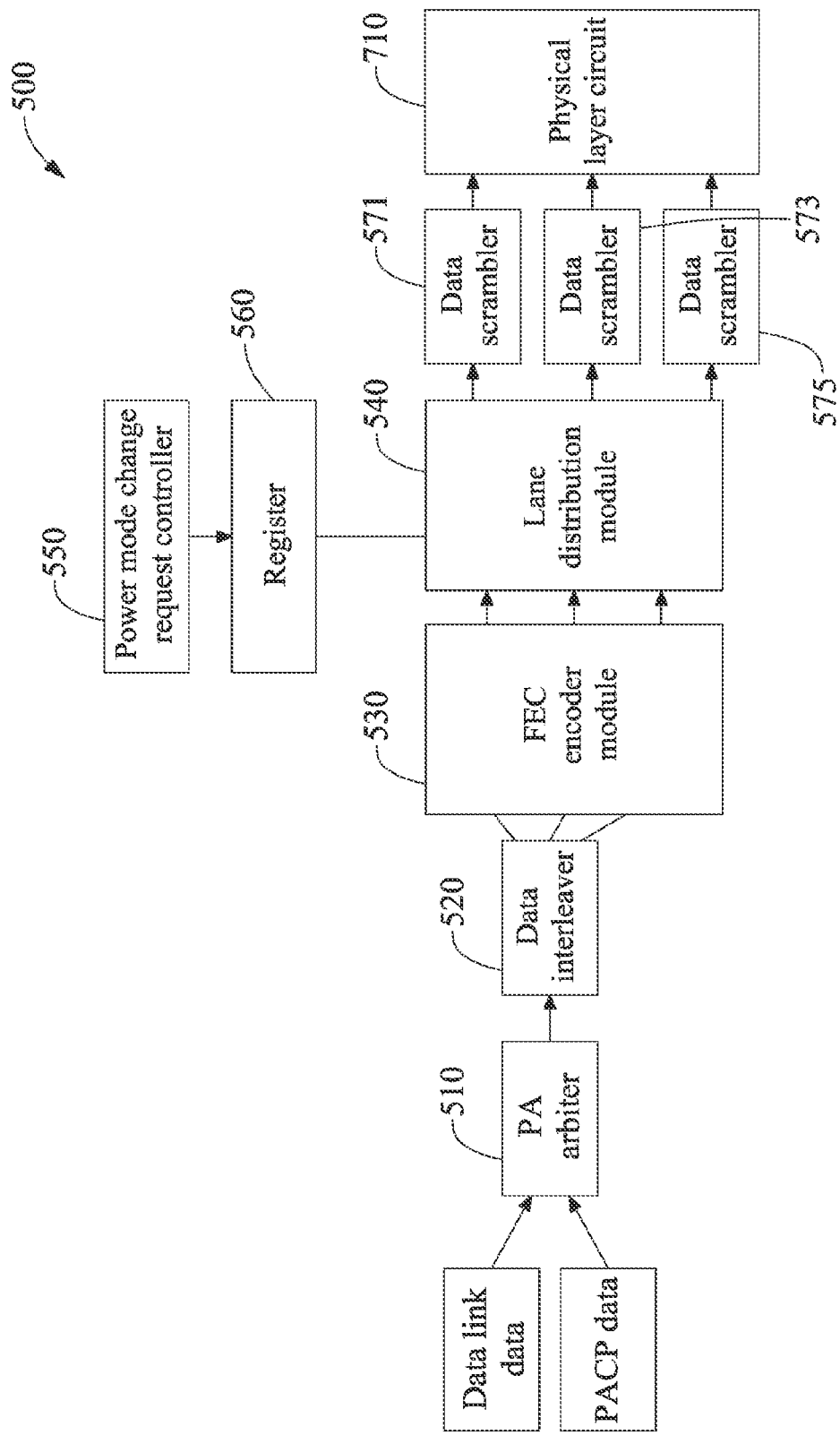
FIG. 15 is a block diagram illustrating an embodiment of circuit architecture for transmission path.

FIG. 15 illustrates an embodiment of circuit architecture for transmission path. The circuit architecture can be realized in a PA layer of an electronic device. In FIG. 15, the circuit architecture 500 for transmission path includes a physical adapter (PA) arbiter 510, a data interleaver 520, an FEC encoder module 530, a lane distribution module 540, and a data scrambling module (e.g., 571-573).

In FIG. 15, a power mode change request controller 550 is to obtain data distribution information (e.g., number of active lanes such as "TxLane" and "RxLane" obtained from a power mode change request frame). After that, the number of active lanes is written into a register (e.g., a register for the physical layer register) for use in selecting one of the lane distribution orders.

The data link layer or PA layer may make a request to the PA arbiter 510 for the permission to use the link. The PA arbiter 510 receives data link data (e.g., data link layer frame) and PACP data (e.g., PACP frame), grants the permission to use the link for either the DL layer or PA layer, selects one of data link data and PACP data, and outputs the selected one to the data interleaver 520. The data interleaver 520 performs interleaving on data and distributes data to an FEC encoder module 530. The FEC encoder module 530 can be implemented based on FIG. 3, for example. The lane distribution module 540 is configured to perform step S20 of FIG. 8 to distribute data symbols of an FEC frame over data scrambler 571, 573, 575 of a data scrambling module associated with 3 active lanes. The data scramblers 571-575 then output data to a physical layer circuit 710.

In an example, the lane distribution module 540 can be implemented based on a piece of pseudo code of hardware description language described in TABLE 1.

TABLE 1

```
Pseudo code for lane distribution in different lane distribution
order
    always@* begin
        if( active lane = = 'd1 ) begin
        //active lanes = 1 ; no distribution
            Scrambler_0_input [15:0]
    = { fec_frame[15:8] , fec_frame [7:0] };
        end
        else if( active lane == 'd2 ) begin
        //active lanes = 2 and first lane distribution order
            Scrambler_0_input [15:0]
    = { fec_frame[23:16] , fec_frame [7:0] };
            Scrambler_1_input [15:0]
    = { fec_frame[31:24] , fec_frame[15:8] };
        End
        Else if (active lane == 'd3 ) begin
        //active lanes = 3 and second lane distribution order
            Scrambler_0_input [15:0]
    = { fec_frame[47:40] , fec_frame[7:0] };
            Scrambler_1_input [15:0]
    = { fec_frame[31:24] , fec_frame[15:8] };
            Scrambler_2_input [15:0]
    = { fec_frame [39:32] , fec_frame[23:16] };
        End
        Else begin ...... // Other case...
        End
    end
```

According to TABLE 1, if the number of active lanes is 2, two data scrambler 571 and 573, for example, are active and used. The input of the data scrambler 571 and 573 can be denoted by Scrambler_0_input[15:0] and Scrambler_1_input[15:0], respectively, and can be configured by the expression:

Scrambler_0_input[15:0]={fec_frame[23:16], fec_frame[7:0]};

and

Scrambler_1_input[15:0]={fec_frame[31:24], fec_frame[15:8]}, wherein fec_frame[ ] indicates an FEC frame. Thus, the corresponding lane distribution order is FEC0, FEC1, FEC2, FEC0, FEC1, FEC2, and so on.

According to TABLE 1, if the number of active lanes is 3, three data scrambler 571, 573, and 575, for example, are active and used. The input of the data scrambler 571, 573, 575 can be denoted by Scrambler_0_input[15:0], Scrambler_1_input[15:0], and Scrambler_2_input[15:0], respectively, and can be configured by the expression:

$$\text{Scrambler\_0\_input}[15:0]=\{\text{fec\_frame}[47:40], \text{fec\_frame}[7:0]\};$$

$$\text{Scrambler\_1\_input}[15:0]=\{\text{fec\_frame}[31:24], \text{fec\_frame}[15:8]\};$$

$$\text{Scrambler\_2\_input}[15:0]=\{\text{fec\_frame}[39:32], \text{fec\_frame}[23:16]\};$$

wherein fec_frame[ ] indicates an FEC frame. Thus, the corresponding lane distribution order is FEC0, FEC1, FEC2, FEC2, FEC0, FEC1, FEC0, FEC1, FEC2, and so on.

Figure 16A:
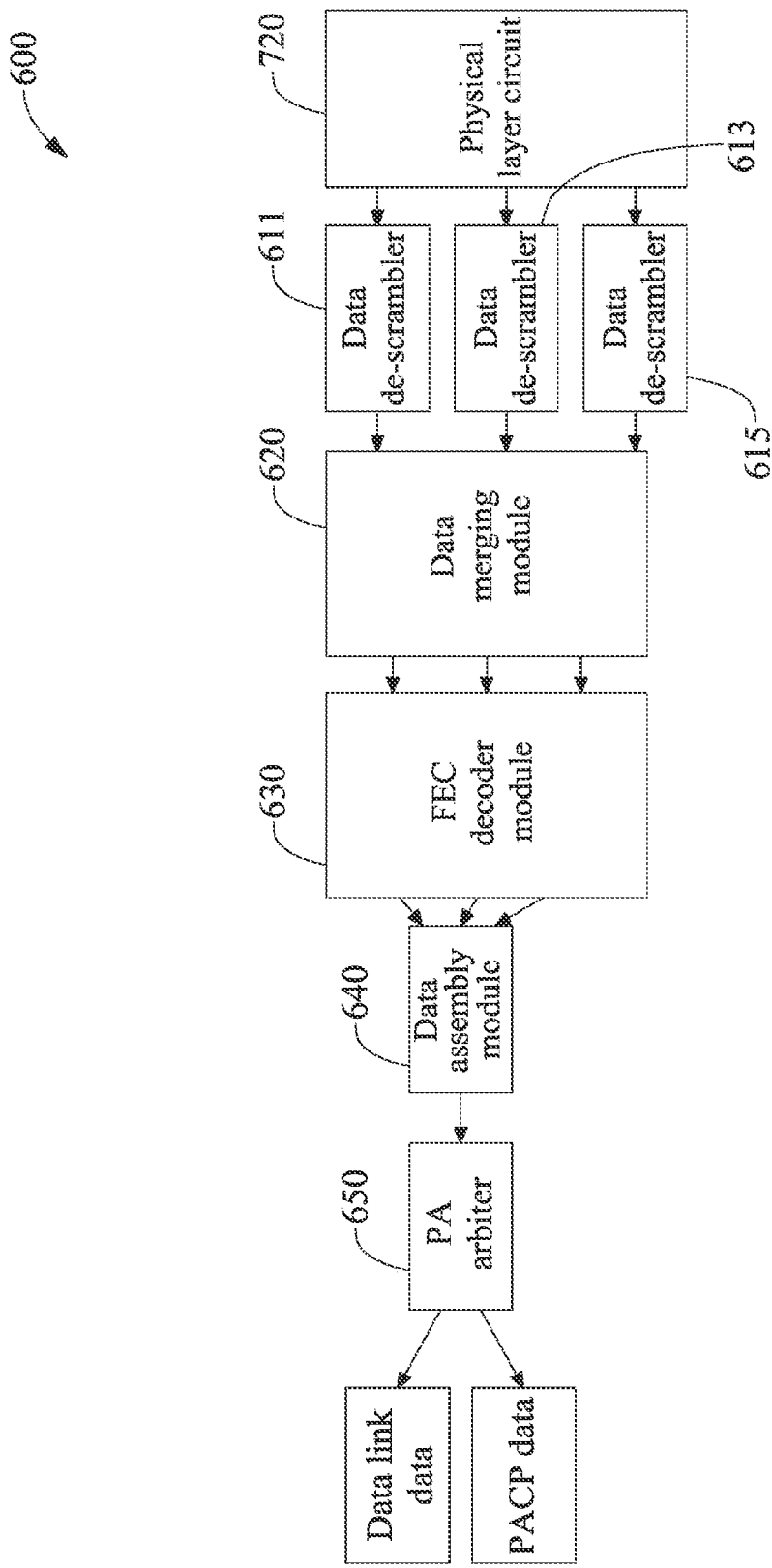
FIG. 16A is a block diagram illustrating an embodiment of circuit architecture for reception path.

FIG. 16A illustrates an embodiment of circuit architecture for reception path. The circuit architecture can be realized in a PA layer of an electronic device. In FIG. 16A, the circuit architecture 600 for reception path includes a data de-scrambling module (e.g., 611-615), a data merging module 620, an FEC decoder module 630, a data assembling module 640, and a PA arbiter 650. The operations of the circuit architecture 600 can be regarded as reverse operations of the operations performed by the circuit architecture 500 for the transmission path as shown in FIG. 15. The data de-scrambling module (e.g., 611-615) receives data from the physical layer circuit 720. After de-scrambling, the data de-scrambling module (e.g., 611-615) outputs data to the data merging module 620. The data merging module 620 performs data merging according to the number of active lanes. After data merging, the data merging module 620 outputs merged data to the FEC decoder module 630 for FEC decoding. After FEC decoding, the FEC decoder module 630 outputs decoded data to the data assembly module 640 for data assembling. After data assembling, the data assembly module 640 outputs assembled data to the PA arbiter 650. The PA arbiter 650 determines whether the assembled data is DL data or PA data and output the assembled data accordingly.

Figure 16B:
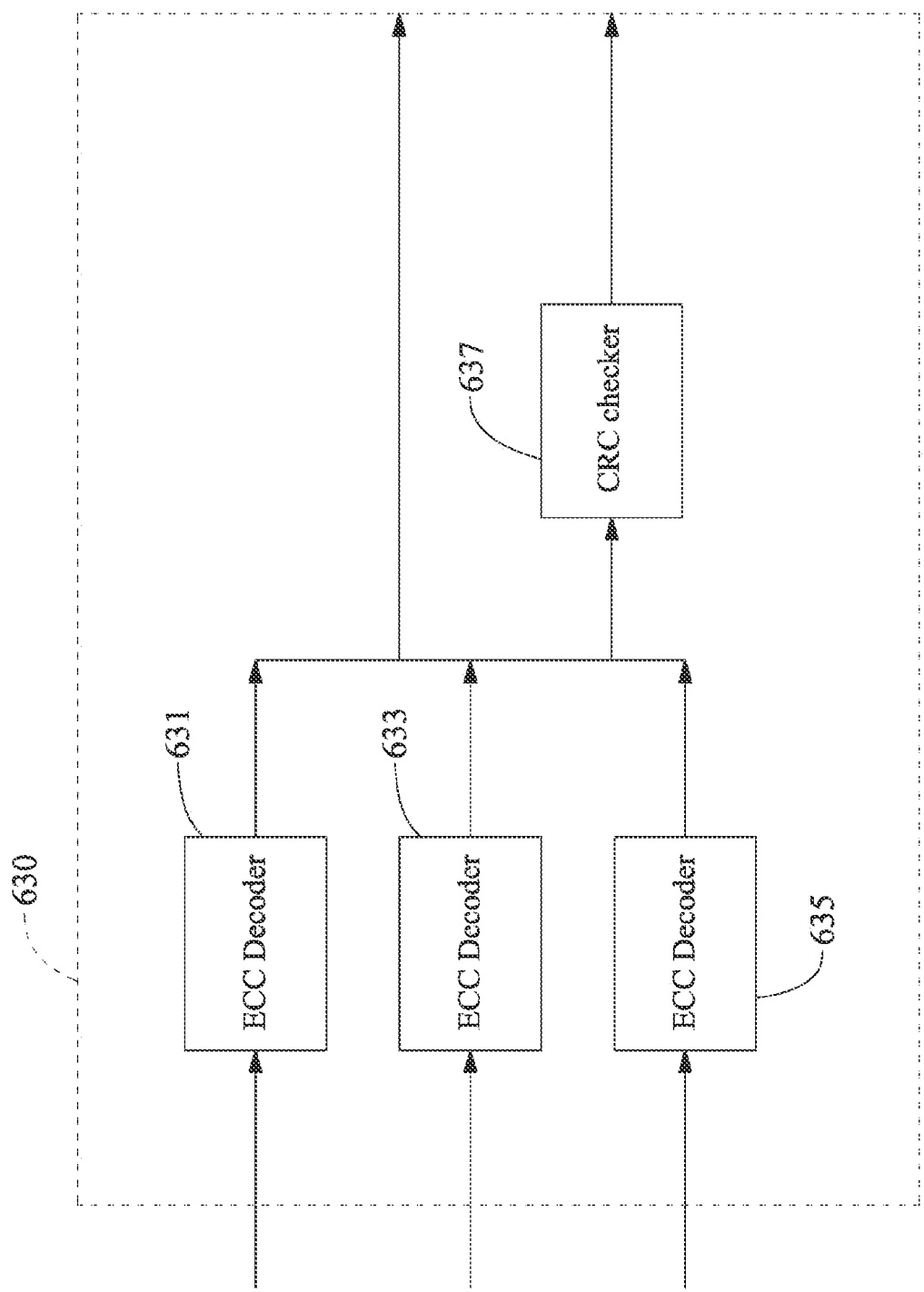
FIG. 16B is a block diagram illustrating an embodiment of FEC decoder module.

FIG. 16B illustrates an embodiment of FEC decoder module. On a receiving side, the FEC decoder module 630 includes ECC decoders 631, 633, and 635, which are active when 3-way interleaved FEC scheme is used. The FEC decoder module 630 further includes a CRC checker 637. The decoding of the ECC decoders 631, 633, and 635 is followed by CRC check performed using the CRC checker 637.

Figure 17:
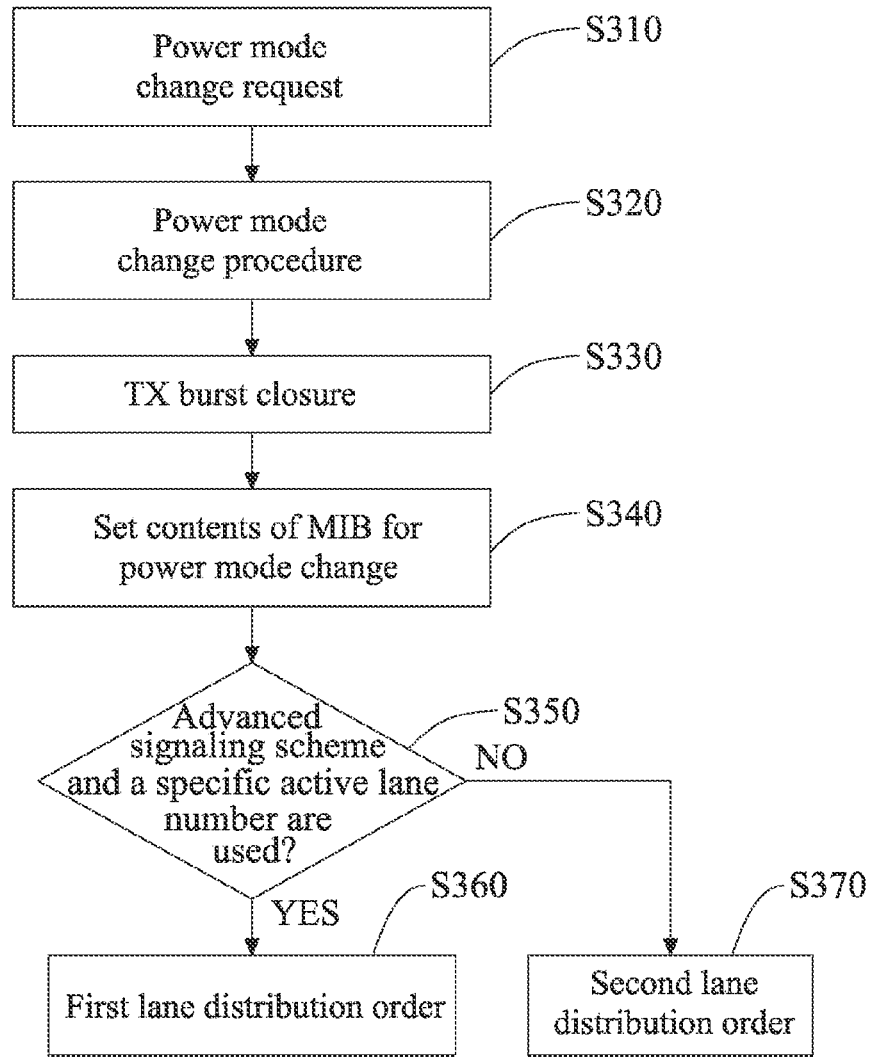
FIG. 17 is a flowchart illustrating an embodiment of a method for an electronic device.

FIG. 17 is a flowchart illustrating an embodiment of a method for an electronic device.

In step S310, a power mode change request is performed.

In step S320, a power mode change procedure is performed.

In step S330, a TX burst is closed.

In step S340, contents of MIB attributes for power mode change are set. Since the TX burst is closed, the contents of MIB attributes for power mode change are set.

In step S350, it is determined whether an advanced signaling scheme and a specific number of active lanes (e.g., number of active lanes is 3 or a multiple of 3) are used. If so, step S360 is performed. If not, step S370 is performed.

In step S360, a first lane distribution order is applied. For example, the first lane distribution order is one of the lane distribution orders as shown in FIG. 7, FIG. 14A to FIG. 14D, and so on.

In step S370, a second lane distribution order is applied. For example, the second lane distribution order is the lane distribution order as shown in FIGS. 4-5.

Referring to FIGS. 18A-18E, embodiments of the method of FIG. 17 are illustrated in schematic diagrams.

The Power mode change flow starts from a power mode change request controller. User can assign a new power configuration. In this new power configuration, FEC is enabled after this new power configuration is activated. Before a new power configuration is activated, handshaking flow is needed to transmit the power configuration to peer side. For example, a module called power mode change request controller issue this new power configuration to peer side and make sure the peer side will be on the same page with new power configuration, FEC enable, and with a proper data distribution in every lane. As compared to the manner of lane distribution according to the UniPro specification, in this embodiment, lane distribution will be changed to different lane distribution order depending upon the number of active lanes, rather than maintaining in the same sequential lane distribution order.

Figure 18A:
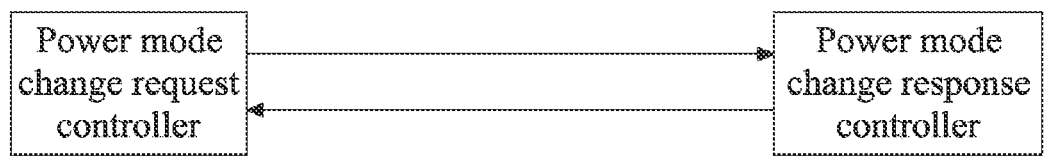
FIG. 18A is a schematic diagram illustrating an example of operation of the method of FIG. 17.

Referring to FIG. 18A, the peer side responds with the power mode change from power mode change response controller. The peer side will receive the new power configuration. It needs to response this request with agreement. It makes sure the peer side will have the consensus for new power configuration and a proper data distribution for the next burst in every lane.

Figure 18B:
FIG. 18B is a schematic diagram illustrating an example of operation of the method of FIG. 17.

In FIG. 18B, after power mode change handshaking is successful, the new power configuration with several information (e.g., gear, speed, data distribution and lane number and so on) is set and stored to the physical layer register for RX and TX.

Figure 18C:
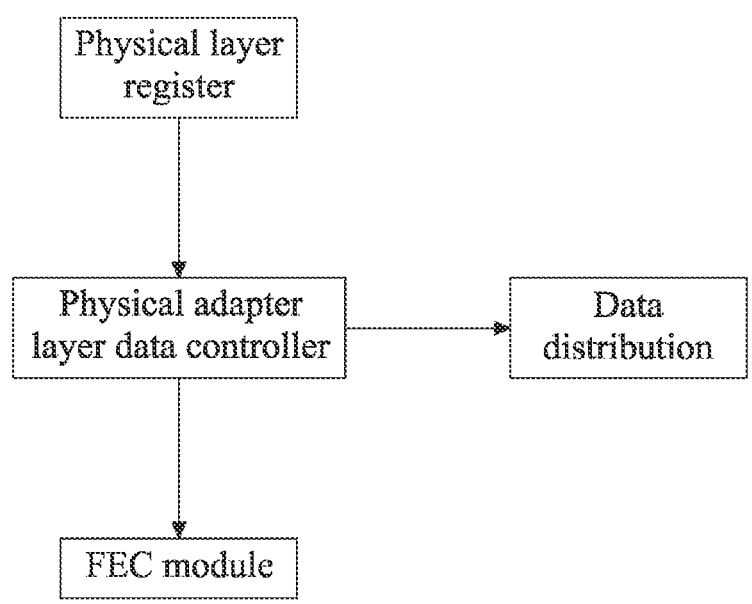
FIG. 18C is a schematic diagram illustrating an example of operation of the method of FIG. 17.

Referring to FIG. 18C, a physical adapter layer data controller will get this information from the physical layer register and decide the data distribution and FEC activity. For example, the information such as gear, speed, data distribution, lane number, and FEC enable, are obtained. Then, the data distribution method and FEC enabling are determined accordingly.

Figure 18D:
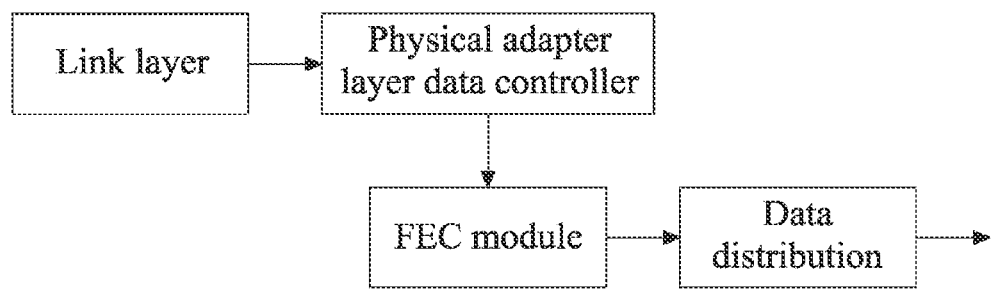
FIG. 18D is a schematic diagram illustrating an example of operation of the method of FIG. 17.

Referring to FIG. 18D, the link layer (e.g., data link layer of UniPro) will transmit the data transfer request to a physical adapter layer data controller. After the physical adapter layer data controller grants the request, the data will transfer to FEC module and data distribution with new configuration. In an example as illustrated in FIG. 11, the lane number is changed from two lanes to three lanes and the data distribution is changed from sequential to cross distribution.

Figure 18E:
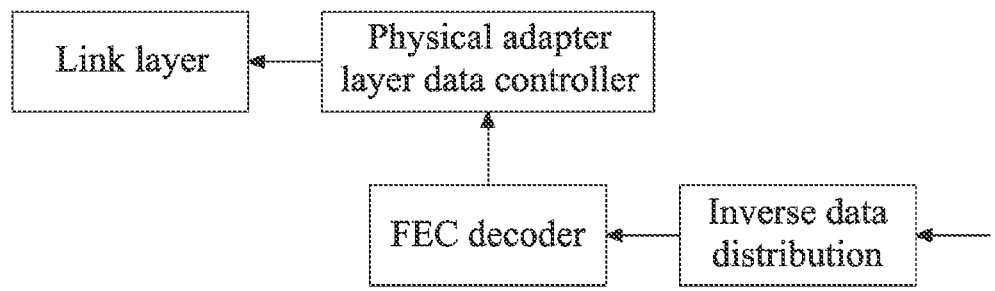
FIG. 18E is a schematic diagram illustrating an example of operation of the method of FIG. 17.

Referring to FIG. 18E, the peer side (e.g., receiving side) operates according to the new configuration. Because the peer side already know the method of new cross distribution, it can get the correct data back to the link layer. As illustrated in FIG. 18E, data received from the physical layer are processed with inverse data distribution, and then processed by the FEC decoder. Accordingly, the physical adapter layer data controller outputs the correct data to the link layer (e.g., data link layer).

In the above embodiments, for the sake of illustration, a three-way interleaved ECC scheme is adopted in the following embodiments. Certainly, the implementation of the present disclosure (e.g., FEC frame, the FEC scheme in the FEC frame, and so on) is not limited to the embodiments or examples.

Further, it is noted that the implementation of an FEC frame is not limited to that shown in FIG. 3. The number of data bytes of a data block in an FEC frame or the number of bytes in the error detection block or error correction blocks can be set to other values. In some embodiments, an FEC frame can be derived from that in FIG. 2 to include a specific number of data bytes, such as 256, or more, whenever appropriate. In some embodiments, the number of error detection codes or error correction codes in an FEC frame can also be modified whenever appropriate.

In addition, in an embodiment, before transmitting the FEC frame by the physical layer, the bytes of the FEC frames are scrambled to make the receiving side possible to distinguish the ordered set pattern from the scrambled data.

The following provides various embodiments for implementation of the interconnection protocol.

Figure 19A:
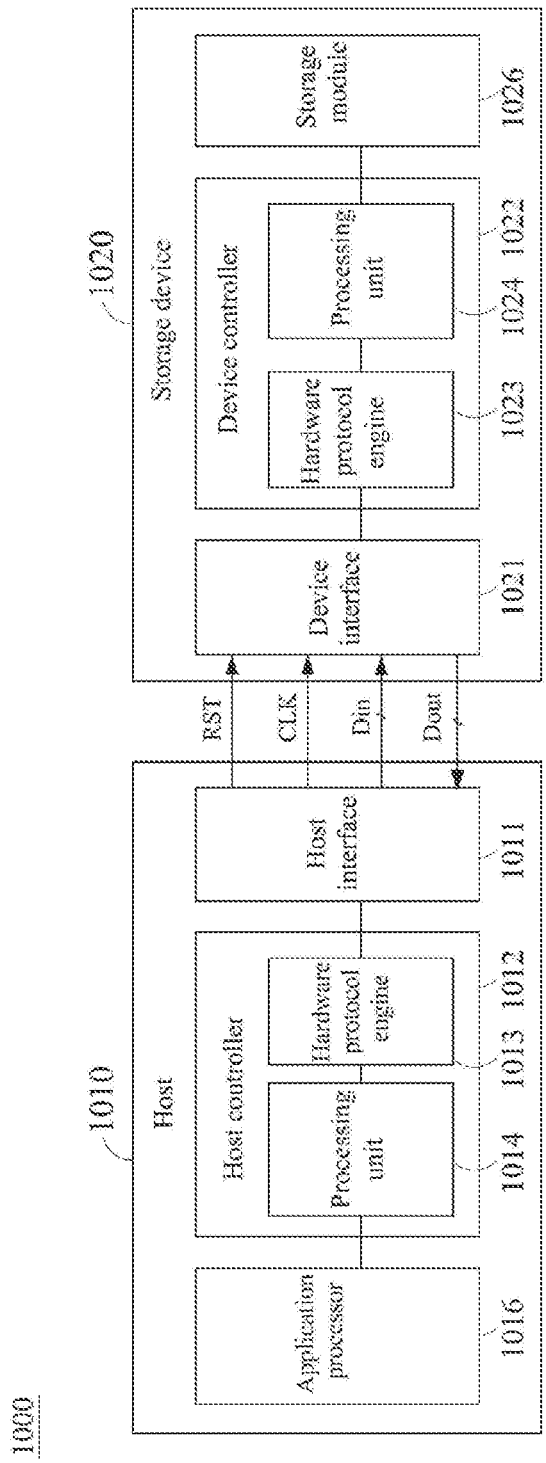
FIG. 19A is a diagram illustrating circuit architecture of a storage system for an interconnection protocol with an FEC according to an embodiment of the present disclosure.
Figure 19B:
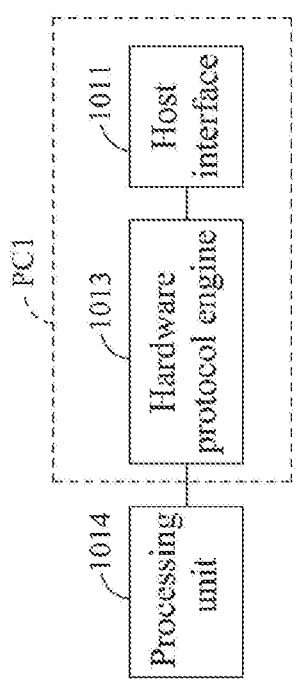
FIG. 19B is a block diagram illustrating circuit architecture applicable to the controller in FIG. 19A for the interconnection protocol according to an embodiment of the present disclosure.
Figure 19C:
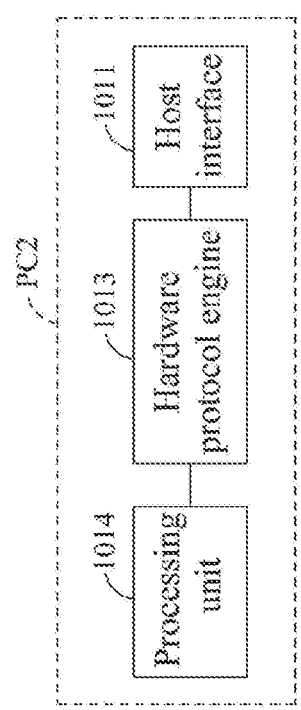
FIG. 19C is a block diagram illustrating circuit architecture applicable to the controller in FIG. 19A for the interconnection protocol according to an embodiment of the present disclosure.

Referring to FIG. 19A, a diagram of circuit architecture is shown according to an embodiment of the present disclosure. As shown in FIG. 19A, a storage system 1000 includes a host 1010 and a storage device 1020. The host 1010 and the storage device 1020 communicate through an interconnection protocol in between, thereby allowing the host 1010 to perform data access of the storage device 1020. The interconnection protocol is capable of transmitting FEC frames as mentioned above based on FIG. 1 or any one or more of the embodiments above. According to the circuit architecture in FIG. 19A, the foregoing technique is applicable to a first device 10 of one or more of the embodiments above capable of communicating with a second device 20 of one or more of the embodiments above according to the interconnection protocol, wherein the host 1010 and storage device 1020 can be used to implement the first device 10 and second device 20 respectively, or vice versa. In the circuit architecture of FIG. 19A, a controller in the host 1010 or the storage device 1020 used to implement the interconnection protocol may be implemented by various configurations. As shown in FIG. 19A, the controller (for example, a host controller 1012) in the host 1010 used to implement the interconnection protocol or the controller (for example, a device controller 1022) in the storage device 1020 used to implement the interconnection protocol can be implemented as circuit architecture including a hardware protocol engine and a processing unit, wherein the processing unit of the controller is optional. In another example, as shown in FIG. 19B, the controller in the host 1010 used to implement the interconnection protocol is referred to as, for example, a protocol controller PC1, which can be configured to include a host interface 1011 and a hardware protocol engine 1013 and be implemented as a single chip, wherein a processing unit 1014 may be regarded as an external circuit of the protocol controller PC1. Moreover, similarly, the controller (or referred to as a protocol controller of the storage device 1020) in the storage device 1020 used to implement the interconnection protocol can be configured to include a device interface 1021 and a hardware protocol engine 1023 and be implemented as a single chip, wherein a processing unit 1024 may be regarded as an external circuit of the protocol controller. For another example, as shown in FIG. 19C, the controller in the host 1010 used to implement the interconnection protocol, for example, a protocol controller PC2, can be configured to include the host interface 1011, the hardware protocol engine 1013 and the processing unit 1014, and be implemented as a single chip. Moreover, similarly, the controller (or referred to as a protocol controller of the storage device 1020) in the storage device 1020 used to implement the interconnection protocol can be configured to include the device interface 1021, the hardware protocol engine 1023, and the processing unit 1024, and be implemented as a single chip. Thus, according to the circuit architecture in FIG. 19A, the controller used to implement the interconnection protocol in the host 1010 or the storage device 1020 can be regarded to cover or represent the embodiment based on FIG. 19A, FIG. 19B, or FIG. 19C. The description of other examples related to FIG. 19A is also suitable for the embodiments based on FIG. 19A, FIG. 19B, or FIG. 19C.

The circuit architecture shown in FIG. 19A has sufficient flexibilities and can be efficiently configured to meet requirements of different products, so as to adapt to diversified designs of manufacturers for better product development. The host 1010 is, for example, a computing device such as a smartphone, a tablet computer, a multimedia device, or other electronic devices. The storage device 1020 is, for example, a storage device inside or outside the computing device, and is such as a storage device based on a non-volatile memory. The storage device 1020 is capable of being written with data under control of the host 1010 or providing written data to the host 1010. The storage device 1020 can be implemented as an internal memory device, memory card, solid state drive (SSD), or so on; however, the implementation of the present disclosure is not limited to the examples above.

The host 1010 includes the host interface 1011, the host controller 1012, and an application processor 1016.

The host interface 1011 implements a physical layer of the interconnection protocol so as to link to the storage device 1020. For example, the host interface 1011 implements a modified version of physical (M-PHY) layer as exemplified above.

The host controller 1012 is coupled between the host interface 1011 and the application processor 1016. When the application processor 1016 needs to perform data access of the storage device 1020, it outputs a corresponding access operation command or write data to the host controller 1012 and communicates with the storage device 1020 through the interconnection protocol, thereby completing data access of the storage device 1020.

The host controller 1012 includes, for example, the hardware protocol engine 1013 and the processing unit 1014, wherein the processing unit 1014 is optional.

The hardware protocol engine 1013 implements a link layer of the interconnection protocol. The link layer can be implemented according to a modified version of UniPro as exemplified above. The hardware protocol engine 1013 communicates with the host interface 1011 and the processing unit 1014 and performs data conversion according to the specification of the link layer. In addition, the hardware protocol engine 1013 (or the host controller 1012) can be regarded as an embodiment of the link controller 100 of the first device 10 shown in FIG. 1.

The processing unit 1014 is coupled to the hardware protocol engine 1013, and communicates with the application processor 1016. The processing unit 1014 can execute one or more pieces of firmware. For example, an access operation command or write data output by an operating system, a driver, or an application executed by the application processor 1016 is converted into a command or data in a format compliant with the link layer of the interconnection protocol by the firmware executed by the processing unit 1014, and is then output to the hardware protocol engine 1013 for processing according to specification of the link layer. Alternatively, read data returned by the storage device 1020 in response to a read command of the host 1010 is returned to the hardware protocol engine 1013 according to the specification of the link layer of the interconnection protocol, and is converted by the corresponding firmware executed by the processing unit 1014 into data in a format that is compliant with and readable by the operating system, driver, or application executed by the application processor 1016. The firmware can be stored, for example, in an internal memory of the processing unit 1014, or be stored in an internal memory of the host controller 1012, wherein the internal memory can include a volatile memory and a non-volatile memory. The processing unit 1014 is optional, that is, the task of the firmware above may be implemented at the hardware protocol engine 1013 in hardware.

The storage device 1020 includes the device interface 1021, the device controller 1022, and a storage module 1026.

The device interface 1021 implements a physical layer of the interconnection protocol to link to the host 1010. For example, the device interface 1021 is for implementing a modified version of physical (M-PHY) layer as exemplified above.

The device controller 1022 is coupled between the device interface 1021 and the storage module 1026. The device controller 1022 has functions corresponding to or similar to those of the host controller 1012 described above, with respect to the interconnection protocol. When the host 1010 issues and outputs an access operation command or write data to the storage device 1020 through the interconnection protocol, the device controller 1022 converts the received data into a corresponding access operation command or write data through the interconnection protocol so as to facilitate data access to be performed by the storage module 1026. Alternatively, the device controller 1022 returns, according to the link layer of the interconnection protocol, read data returned by the storage device 1020 in response to the read command of the host 1010 to the host 1010. The storage module 1026 includes, for example, a memory chip of one or more non-volatile memories, and is, for example, a flash memory chip. In one example, the storage device 1020 may further include a flash memory controller. The flash memory controller is coupled between the device controller 1022 and the storage module 1026, and can be configured to control write, read, or erase operations of the storage module 1026, and is capable of performing data exchange with the storage module 1026 through an address bus or a data bus. In another example, the flash memory controller may be further provided in the device controller 1022.

The device controller 1022 includes, for example, the hardware protocol engine 1023 and the processing unit 1024, wherein the processing unit 1024 is optional.

The hardware protocol engine 1023 implements a link layer of the interconnection protocol. The link layer can be implemented according to a modified version of UniPro as exemplified above. The hardware protocol engine 1023 communicates with the device interface 1021 and the processing unit 1024 and performs data conversion according to the specification of the link layer. In addition, the hardware protocol engine 1023 (or the device controller 1022) can be regarded as an embodiment of the link controller 200 of the second device 20 shown in FIG. 1.

The processing unit 1024 is coupled to the hardware protocol engine 1023, and communicates with the host 1010 through the device interface 1021. The processing unit 1024 can execute one or more pieces of firmware. For example, the processing unit 1024 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 1024, an internal memory of the device controller 1022, or a predetermined storage region of the storage module 1026, wherein the internal memory can include a volatile memory and a non-volatile memory.

As shown in FIG. 19A, the host interface 1011 can be coupled to the device interface 1021, for example, through data lines Din and Dout for transmitting and receiving data, a reset line RST for transmitting a hardware reset signal, and a clock line CLK for transmitting a clock signal. The data lines Din and Dout can be implemented in multiple pairs, wherein one pair of data lines Din or one pair of data lines Dout can be referred to as a lane for transmitting differential signals, for example. The host interface 1011 can communicate with the device interface 1021 by using at least one interface protocol, for example, based on an advanced signaling scheme; however, the implementation of the disclosure is not limited to the examples above. Under a modified version of the UFS standard, the host 1010 and the storage device 1020 may also be configured with multiple lanes in between to improve transmission efficiency, wherein either of the directions from the host 1010 to the storage device 1020 or from the storage device 1020 to the host 1010 can support one or more lanes, and the multiple lanes can be selectively set to be active or inactive.

A modified version of the UFS standard is taken as an example of the interconnection protocol for illustration. The UFS standard includes a UFS command set (UCS) layer, a UFS transport (UTP) layer, and a UFS interconnect (UIC) layer. The UIC layer includes a link layer and a physical layer. In the interconnection protocol, the link layer of the UIC layer can be implemented according to a modified version of the UniPro specification, and the physical layer of the UIC layer can be implemented according to a modified version of the M-PHY specification. Under the interconnection protocol, since the implementations of the modified UniPro and modified M-PHY with respect to the FEC are hidden from the other layers (such as UCS, UTP layers) of the UFS standard, the implementation complexity of the interconnection protocol can be reduced.

Figure 20:
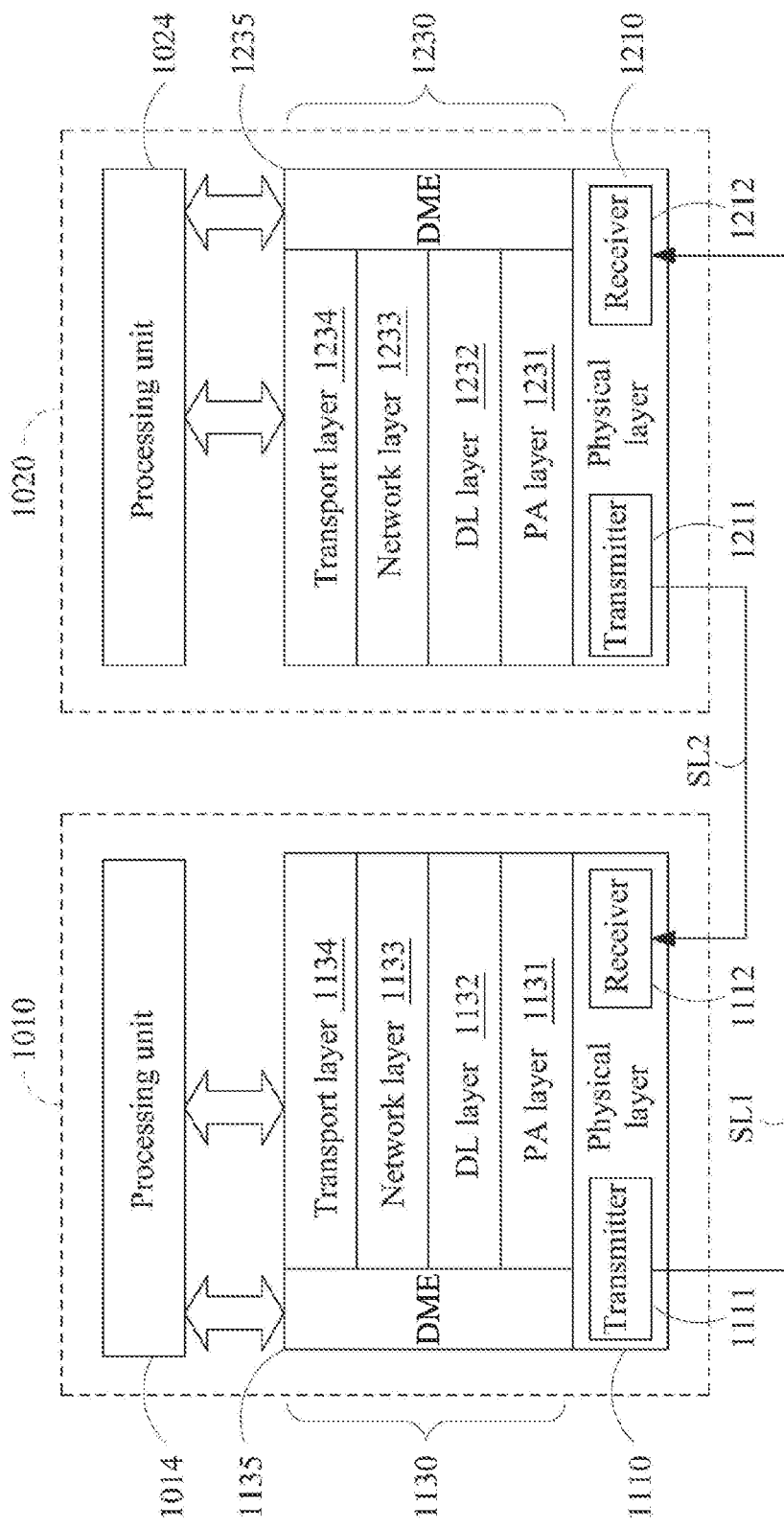
FIG. 20 is a schematic diagram of an embodiment of a layered structure of the storage system in FIG. 19A.

Referring to FIG. 20, a schematic diagram of an embodiment of layered architecture of the storage system in FIG. 19A is shown according to the UFS standard and FIG. 1. Because the UFS standard is based on the MIPI UniPro layer and the MIPI M-PHY layer, the host interface 1011 and the hardware protocol engine 1013 of the host 1010 shown in FIG. 19A are respectively used to implement a modified physical layer 1110 and a modified UniPro layer 1130 in FIG. 20. Also, the device interface 1021 and the hardware protocol engine 1023 of the storage device 1020 in FIG. 19A are respectively used to implement a modified physical layer 1210 and a modified UniPro layer 1230 in FIG. 20.

As shown in FIG. 20, the modified UniPro layer 1130 (or 1230) can include a modified physical adapter (PA) layer 1131 (or 1231), a data link (DL) layer 1132 (or 1232), a network layer 1133 (or 1233), and a transport layer 134 (or 1234). The layers in the modified UniPro layer 1230 of the storage device 1020 can also similarly operate and be implemented.

The modified physical adapter layer (1131 or 1231) couples the modified physical layer (1110 or 1210) to the data link layer (1132 or 1232). The modified physical adapter layer (1131 or 1231) is capable of performing bandwidth control and power management between the modified physical layer (1110 or 1210) and the data link layer (1132 or 1232). In practice, the modified physical layer 1110 of the host 1010 includes a transmitter (TX) 1111 and a receiver (RX) 1112, and the modified physical layer 1210 of the storage device 1020 includes a transmitter (TX) 1211 and a receiver (RX) 1212, thereby establishing data lanes SL1 and SL2 to perform full duplex communication. The modified UniPro specification may support multiple data lanes for a link in each transmission direction (for example, forward or backward).

The data link layer (1132 or 1232) is capable of performing flow control of data transmission between the host 1010 and the storage device 1020. The data link layer is capable of performing error detection and re-transmission of a frame in case of errors, according to one or more of the embodiments above.

The network layer (1133 or 1233) is used to select a routing function for a transmission path for the packets received from the transport layer (1134 or 1234).

The transport layer (1134 or 1234) can use a command received from the UFS application layer to configure a data segment suitable for the protocol and transmit the data segment to the network layer (1133 or 1233), or can extract a command from packets received from the network layer (1133 or 1233) and transmit the command to the UFS application layer.

Moreover, the modified UniPro layer (1130 or 1230) can be further implemented with a device management entity (DME) (1135 or 1235), which can communicate with the layers in the modified physical layer (1110 or 1210) and the modified UniPro layer (1130 or 1230), for example, the modified physical adapter layer (1131 or 1231), the data link layer (132 or 232), the network layer (1133 or 1233), and the transport layer (1134 or 1234), so as to communicate with the UFS application layer, thereby implementing the modified unified protocol (UniPro) overall functions such as control or configuration functions including power-on, power-off, reset, and power mode change.

The circuit architecture of FIG. 19A, FIG. 19B, FIG. 19C, or FIG. 20 can be configured to perform operations according to one or more of the embodiments or related examples based on FIG. 8 or FIG. 9, whenever appropriate.

The circuit architecture in FIG. 15, 16A, 16B can be applied to a controller in FIG. 19A, FIG. 19B, FIG. 19C, or FIG. 20 to perform operations according to one or more of the embodiments or related examples based on FIG. 8 or FIG. 9, whenever appropriate.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

The present disclosure is described by using the multiple embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method performed by an electronic device, the method comprising:
obtaining a forward error correction (FEC) frame including a data block, an error detection block associated with the data block, and an error correction block associated with the data block and the error detection block;
distributing the FEC frame over a plurality of lanes of the link in one of a plurality of different lane distribution orders selectively based on a number of active lanes included in the plurality of active lanes; and
transmitting the FEC frame over the plurality of lanes of the link to a second electronic device;
wherein:
a first lane distribution order of the plurality of different lane distribution orders is utilized when the number of active lanes is a first number;
a second lane distribution order of the plurality of different lane distribution orders is utilized when the number of active lanes is a second number; and
wherein the first lane distribution order is different from the second lane distribution order.

2. The method according to claim 1, wherein the error correction block is obtained based on an N-way interleaved FEC scheme, wherein N is greater than or equal to three.

3. The method according to claim 2, wherein data symbols of the FEC frame are divided into N FEC groups for the N-way interleaved FEC scheme, wherein for at least two of the plurality of lanes, every two adjacent data symbols distributed on the same lane and taken from the FEC frame are associated with two of the N FEC groups.

4. The method according to claim 2, wherein data symbols of the FEC frame are divided into N FEC groups for the N-way interleaved FEC scheme; when the number of active lanes is a multiple of N, the data symbols of the FEC frame are distributed over the plurality of lanes of the link in a first lane distribution order selected based on the number of active lanes, wherein in the first lane distribution order, for each of the plurality of lanes, a first data symbol of the data symbols for a first group of the N FEC groups on one of the lanes is followed by a second data symbol of the data symbols for a second group of the N FEC groups on the same lane.

5. The method according to claim 4, wherein when the number of active lanes is other than a multiple of N, the data symbols of the FEC frame are distributed over the plurality of lanes of the link in a second lane distribution order selected based on the number of active lanes, wherein in the second lane distribution order, for each of the plurality of lanes, a first data symbol of the data symbols for a first group of the N FEC groups on one of the lanes is followed by a second data symbol of the data symbols for a second group of the N FEC groups on the same lane, wherein the second lane distribution order is different from the first lane distribution order.

6. The method according to claim 1, wherein the data block includes data symbols from a data link layer or a physical adapter layer of the electronic device.

7. The method according to claim 6, wherein the data symbols from the data link layer or physical adapter layer of the electronic device are based on a Unified Protocol (UniPro).

8. The method according to claim 1, wherein the error correction block is obtained based on an N-way interleaved FEC scheme wherein N is an integer, wherein the first number is a multiple of N, and where the second number is not a multiple of N.

9. An electronic device comprising:
an interconnection controller including:
a physical layer circuit for signal transmission; and
a link controller for data transmission, coupled to the physical layer circuit, wherein the interconnection controller is configured to perform:
generating a forward error correction (FEC) frame including a data block, an error detection block associated with the data block, and an error correction block associated with the data block and the error detection block;
distributing the FEC frame over a plurality of lanes of the link in one of a plurality of different lane distribution orders selectively based on a number of active lanes included in the plurality of active lanes; and
transmitting the FEC frame over the plurality of lanes of the link to a second electronic device;
wherein:
a first lane distribution order of the plurality of different lane distribution orders is utilized when the number of active lanes is a first number;
a second lane distribution order of the plurality of different lane distribution orders is utilized when the number of active lanes is a second number; and
wherein the first lane distribution order is different from the second lane distribution order.

10. The electronic device according to claim 9, wherein the error correction block is obtained based on an N-way interleaved FEC scheme, wherein N is greater than or equal to three.

11. The electronic device according to claim 10, wherein data symbols of the FEC frame are divided into N FEC groups for the N-way interleaved FEC scheme, wherein for at least two of the plurality of lanes, every two adjacent data symbols distributed on the same lane and taken from the FEC frame are associated with two of the N FEC groups.

12. The electronic device according to claim 10, wherein data symbols of the FEC frame are divided into N FEC groups for the N-way interleaved FEC scheme; when the number of active lanes is a positive multiple of N, the data symbols of the FEC frame are distributed over the plurality of lanes of the link in a first lane distribution order selected based on the number of active lanes, wherein in the first lane distribution order, for each of the plurality of lanes, a first data symbol of the data symbols for a first group of the N FEC groups on one of the lanes is followed by a second data symbol of the data symbols for a second group of the N FEC groups on the same lane.

13. The electronic device according to claim 12, wherein when the number of active lanes is other than a positive multiple of N, the data symbols of the FEC frame are distributed over the plurality of lanes of the link in a second lane distribution order selected based on the number of active lanes, wherein in the second lane distribution order, for each of the plurality of lanes, a first data symbol of the data symbols for a first group of the N FEC groups on one of the lanes is followed by a second data symbol of the data symbols for a second group of the N FEC groups on the same lane, wherein the second lane distribution order is different from the first lane distribution order.

14. The electronic device according to claim 9, wherein the data block includes data symbols from a data link layer or a physical adapter layer of the electronic device.

15. The electronic device according to claim 14, wherein the data symbols from the data link layer or physical adapter layer of the electronic device are based on a Unified Protocol (UniPro).

16. The electronic device according to claim 9, wherein the error correction block is obtained based on an N-way interleaved FEC scheme wherein N is an integer, wherein the first number is a multiple of N, and where the second number is not a multiple of N.

* * * * *